United States Patent
Li et al.

(10) Patent No.: US 8,990,838 B2
(45) Date of Patent: *Mar. 24, 2015

(54) AGGREGATE PERSONAL COMPUTER SYSTEM

(75) Inventors: Yang Li, Beijing (CN); Lifeng Wang, Beijing (CN); Jian Wang, Beijing (CN); Chao Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 159 days.

This patent is subject to a terminal disclaimer.

(21) Appl. No.: 13/178,270

(22) Filed: Jul. 7, 2011

(65) Prior Publication Data

US 2011/0289518 A1 Nov. 24, 2011

Related U.S. Application Data

(63) Continuation of application No. 11/821,754, filed on Jun. 25, 2007, now Pat. No. 8,001,553.

(51) Int. Cl.
*G06F 9/44* (2006.01)
*G06F 9/455* (2006.01)

(52) U.S. Cl.
CPC .......... *G06F 9/4411* (2013.01); *G06F 9/45537* (2013.01)
USPC .......................................... 719/324; 719/327

(58) Field of Classification Search
None
See application file for complete search history.

(56) References Cited

U.S. PATENT DOCUMENTS

| | | | | |
|---|---|---|---|---|
| 5,359,660 A | * | 10/1994 | Clark et al. | 726/3 |
| 5,655,148 A | * | 8/1997 | Richman et al. | 710/8 |
| 5,748,980 A | * | 5/1998 | Lipe et al. | 710/8 |
| 5,877,745 A | * | 3/1999 | Beeteson et al. | 345/156 |
| 5,937,176 A | | 8/1999 | Beasley et al. | |
| 6,069,615 A | | 5/2000 | Abraham et al. | |
| 6,466,982 B1 | * | 10/2002 | Ruberg | 709/227 |
| 7,167,260 B2 | | 1/2007 | Iwata et al. | |
| 7,646,708 B2 | | 1/2010 | McGee et al. | |
| 7,694,312 B2 | * | 4/2010 | Rivard et al. | 719/321 |
| 7,788,349 B2 | * | 8/2010 | Tada | 709/220 |
| 8,001,553 B2 | * | 8/2011 | Li et al. | 719/324 |

(Continued)

OTHER PUBLICATIONS

"Multiplicity"; http://www.stardock.com/products/multiplicity/; Feb. 26, 2007.

(Continued)

*Primary Examiner* — Van Nguyen
(74) *Attorney, Agent, or Firm* — Dan Choi; Judy Yee; Micky Minhas

(57) ABSTRACT

Described is an aggregate computer system that operates by sharing devices of networked computing machines. A consumer machine uses a real device of a producer machine as a virtual device, by coupling the real driver of the real device over the network to a virtual driver of the consumer machine. Each machine may include an aggregate device manager that manages the virtual devices, and/or an aggregate connection manager that processes communications received over at least two different types of networks. Each machine may include a virtual bus and virtual bus driver that simulates a physical connection of a remote device to that machine via a bus. Upon receiving a request to plug-in a virtual device, the consumer machines queries for information of the device, and loads a virtual driver based on the device information when received. The consumer machine may query by sending plug-and-play events to the virtual bus.

20 Claims, 9 Drawing Sheets

(56) References Cited

U.S. PATENT DOCUMENTS

| | | | |
|---|---|---|---|
| 8,378,782 B2* | 2/2013 | Orr | 340/5.3 |
| 2002/0105553 A1 | 8/2002 | Segre | |
| 2003/0092437 A1 | 5/2003 | Nowlin et al. | |
| 2004/0189439 A1* | 9/2004 | Cansino | 340/5.2 |
| 2005/0179647 A1 | 8/2005 | Simmons et al. | |
| 2005/0190148 A1 | 9/2005 | Fujita | |
| 2005/0193118 A1* | 9/2005 | Le et al. | 709/227 |
| 2005/0257218 A1* | 11/2005 | Lin | 717/178 |
| 2005/0270551 A1* | 12/2005 | Choi | 358/1.13 |
| 2006/0059287 A1* | 3/2006 | Rivard et al. | 710/300 |
| 2006/0126619 A1 | 6/2006 | Teisberg et al. | |
| 2006/0164381 A1 | 7/2006 | Suk et al. | |
| 2006/0165074 A1 | 7/2006 | Modi et al. | |
| 2006/0176293 A1 | 8/2006 | Hoshino | |
| 2006/0230110 A1 | 10/2006 | VanHarlingen et al. | |
| 2006/0244724 A1 | 11/2006 | Erickson | |
| 2007/0088893 A1* | 4/2007 | Carnahan | 710/302 |
| 2007/0200666 A1* | 8/2007 | Howard | 340/5.62 |
| 2007/0288937 A1 | 12/2007 | Durojeiye et al. | |
| 2008/0320501 A1 | 12/2008 | Li et al. | |
| 2011/0283002 A1* | 11/2011 | King | 709/227 |

OTHER PUBLICATIONS

Snyder, Robin; "The use of multiple monitor and KVM (keyboard, video, and mouse) technologies in an educational setting"; Jun. 6-10, 2004; Proceedings of the 2004 ASCUE Conference; Myrtle Beach, South Carolina; pp. 232-238.

* cited by examiner

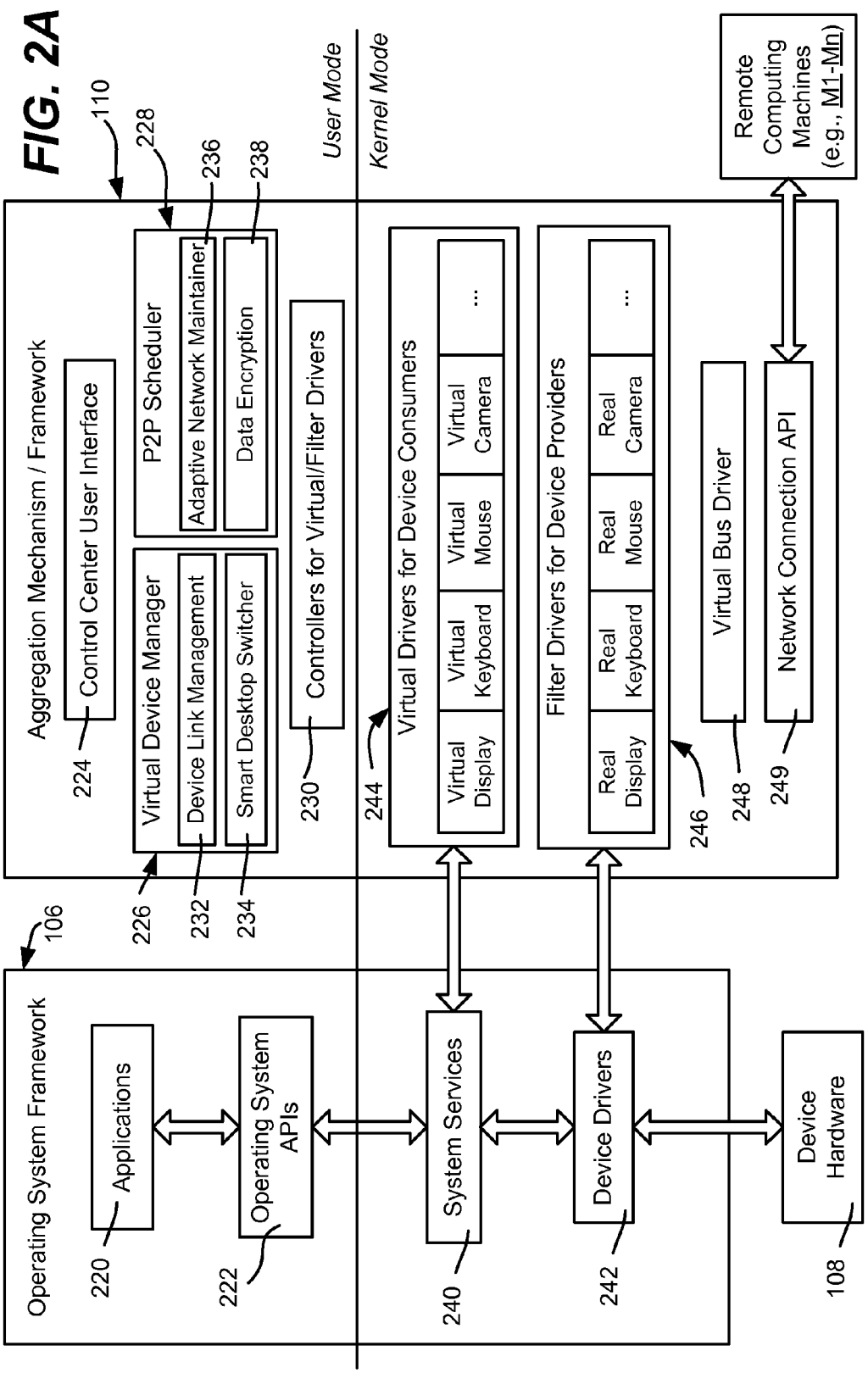

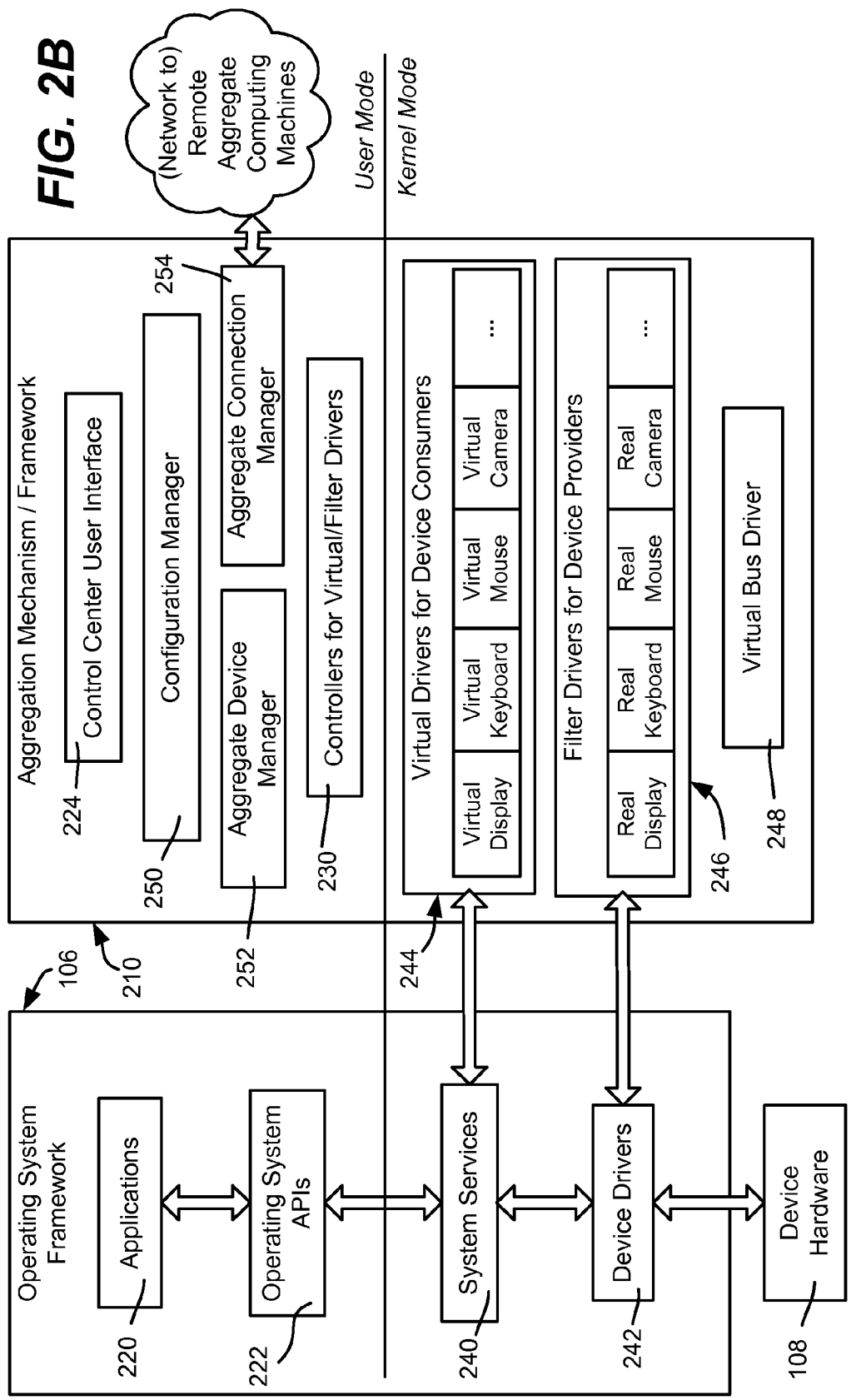

AGGREGATE PERSONAL COMPUTER SYSTEM

CROSS-REFERENCE TO RELATED APPLICATION

The present application is a continuation of U.S. patent application Ser. No. 11/821,754 filed Jun. 25, 2007, now U.S Pat. No. 8,001,553 issued Aug. 16, 2011, which is incorporated herein by reference.

BACKGROUND

Contemporary operating systems are primarily designed for personal computer use, which tends to create complexity when attempting to couple additional computing machines to the personal computer. For example, for many computer users it is a difficult task to establish a connection between the user's personal computer such as a laptop and the user's Smartphone (herein considered a computing machine with mobile telephone capability), even when the two computing machines both run operating systems from the same operating system vendor.

Further, consider a user working with locally networked computers. Even thought the computers are networked, they are disaggregated with respect to resource sharing. For example, each computer system has its own mouse and keyboard, and in general the user cannot seamlessly use the mouse and keyboard of one computer with another computer, (e.g., without manually changing the wired or wireless connections).

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which an aggregate computer system is provided by sharing the devices of a plurality of computing machines that are coupled to one another by a network. For example, each computing machine of the aggregate computer system may have at least one device that can be used by each other computing machine as a virtual device. This is facilitated by coupling a real driver of a real device of one computing machine over the network to a virtual driver corresponding to that real device of another computing machine.

In one implementation, a first machine may act as a device producer by coupling a real driver of the device to the communications means. A second machine consumes the device of the first machine for use as a device of the second machine by coupling a virtual driver for the device to the communications means. The first and second machines may be both device consumers and device producers.

Each machine may include an aggregate device manager that manages the device, and/or an aggregate connection manager that processes communications received over at least two different types of networks corresponding to the communications means. The aggregate connection manager includes connection APIs for accessing channel management functionality, including for managing a virtual named channel, managing a relationship between virtual named channel instances and underlying sockets, transferring data and handling exceptions. The aggregate connection manager also may include connection APIs for accessing host management functionality, including discovering available hosts and resolving a network address of a host.

Each machine may include a virtual bus and a virtual bus driver that simulates a physical connection of a remote device to that machine via a bus. For example, the virtual bus may simulate one or more of a PCI bus, an AGP bus, and/or a USB bus, including at the same time. Example devices for which virtual drivers facilitate virtual device usage include a sound card device, a network card device, a graphics card device, a keyboard device, a pointing device and/or a camera device. Via controller means, an application program or the like can use real devices of a computing machine along with one or more virtual devices as if each device was physically part of that computing machine.

In one aspect, a request may be made to couple a consumer computing machine to a virtual device. Upon receiving a request to plug-in a virtual device that is a real device of a producer computing machine, the consumer machines queries for information of the device. Upon receiving the device information, the consumer computing machine loads a virtual driver based on the device information. The consumer computing machine may query for the information of the device and for other information such as an updated device list by sending plug-and-play events, e.g., to the virtual bus.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which:

FIG. 2A is a block diagram representation of a suitable example architecture for a computing machine that participates as part of an aggregate computing system.

FIG. 2B is a block diagram representation of a suitable example alternative architecture for a computing machine that participates as part of an aggregate computing system

DETAILED DESCRIPTION

Various aspects of the technology described herein are generally directed towards an aggregate (e.g., personal) computing system, in which various computing machines are aggregated into what is generally a unified entity, instead of operating as separate parts. For example, a user can couple two or more computing machines into an aggregated computer system, and thereafter control each machine's connected hardware devices (via wired and/or wireless connections) from a uniform user interface, such as to perform pointing device (e.g., mouse) switching, keyboard switching, use a SmartPhone as a media center user interface, use a SmartPhone camera as a local computer camera, provide a multiple-display system, and access a vast amount of storage space. To this end, a framework/mechanism is provided that uniformly controls the aggregate personal computer, comprised of multiple computing machines and their hardware devices, as a unified entity. From the user's perspective, the control and device usage is a seamless and relatively easy computing experience.

While the technology is described with various examples and architectures that provide flexible computing environments that are also stable and reliable, adaptable, intelligent, secure, extendable and updatable, it is understood that the architectures and components thereof are only examples of possible implementations. For example, some of the described separate components may be combined into a lesser number of components, while other components may be further separated into a greater number of components. In addition, much of the communication between devices describes an example network and example functions, structures and communication protocols, however it is understood that any suitable way of coupling devices for communication may be used.

As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing in general.

Figure 1:
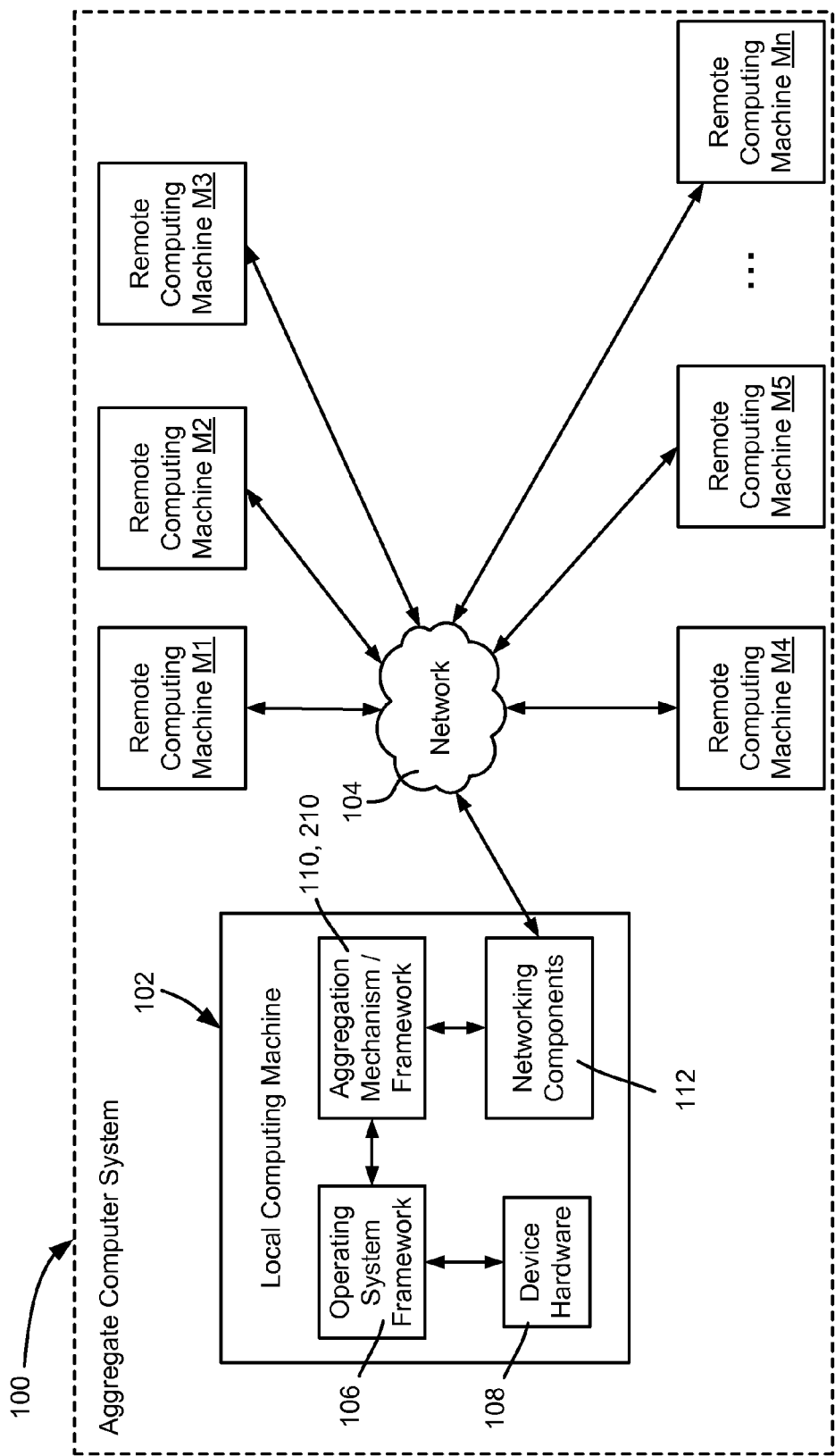
FIG. 1 is an example block diagram representation of an aggregate computing system comprising various interconnected computing machines.

Turning to FIG. 1, there is shown a general block diagram in which an example aggregate computer system 100 is comprised of a local computing machine 102 coupled via a network 104 to remote computing machines M1-Mn. While one local computing machine 102 and six such remote computing machines M1-Mn are exemplified in FIG. 1, it is understood that as few as one such remote computing machine up to any practical number may be present in a given environment. Moreover, although one machine is described as being "local" with respect to other remote machines, in general, any machine can act as the local machine, and thus "local" generally represents the one machine with which the user is (or the user believes to be) physically interacting at a given moment.

The network 104 may be any suitable wired or wireless network, or a combination of wired and wireless communication means, such as Ethernet and/or WiFi, and so forth. Remote computing machines and/or their hardware devices also may be coupled by other means, such as USB (Universal Serial Bus), serial, parallel, infrared, FireWire, Bluetooth® and the like; note that while some of these may not necessarily be considered "network" connections in a conventional sense, for purposes of simplicity in this description, any such connections can be considered as networked via the network 104.

As described in more detail below, the local computing machine 102 includes an operating system framework 106, its local device hardware 108, and an aggregation mechanism/framework 110 coupled to the network through networking components 112. In general, each of the remote devices M1-Mn includes similar components, at least to the extent that each participates as part of the aggregate computer system 100. For example, a mobile telephone may not have sufficient resources to provide the same functionality as a personal computer, but still may make some or all of its software programs and/or hardware available to the aggregate computer system 100 to an extent.

FIG. 2A shows one example architecture in which device aggregation components provide for the basically seamless sharing of devices and programs between various computing machines 102 and M1-Mn. The computing machines may include any mobile devices within the local network 104. As represented in the example implementation of FIG. 2A, there is a set of user mode components, which in the operating system framework 106 include applications 220 (also representing any user-mode operating system components) and a set of operating system APIs 222. In the example of FIG. 2A, the aggregation mechanism/framework 110 user mode components include a user interface component 224, a virtual device manager 226, a peer-to-peer (P2P) scheduler 228 and controllers 230 for virtual/filter drivers. The virtual device manager 226 includes a device link management component 232, and a smart desktop switcher 234. The P2P scheduler 228 includes an adaptive network maintainer component 236 and a data encryption component 238. Note that the layering of components is shown in this example aggregation mechanism/framework 110, but connections between these aggregation-related components are omitted for purposes of clarity.

Another set of components comprise kernel mode components, and in the example operating system framework 106 include system services 240 and device drivers 242 for the machine hardware 108. As described below, for the aggregation mechanism framework 110 there are virtual drivers 244, filter drivers 246, and one or more virtual bus drivers 248. In this example, a network connection API set 249 is provided for communicating with the remote devices (e.g., M1-Mn).

FIG. 2B shows an alternative architecture, in which like numbers to those represented in FIG. 2A represent like components, and which are generally not described again for purposes of brevity. Further, again note that the layering of components is shown in this example aggregation mechanism/framework 210, but connections between the aggregation components are omitted for purposes of clarity.

In FIG. 2B, a configuration manager 250 is provided as a user mode component, as is an aggregate device manager 252 and aggregate connection manager 254. Much of the structure and functionality of these components are the same as example counterpart components of FIG. 2A, however note that the aggregate connection manager 254 generally couples to the remote machines and their hardware devices in the example of FIG. 2B.

For purposes of brevity, the following description is primarily with reference to FIG. 2B, with the aggregate device manager 252 of FIG. 2B generally similar to the virtual device manager 226 of FIG. 2A, and the aggregate connection manager 254 of FIG. 2B generally similar to the P2P scheduler 228 of FIG. 2A.

In general, regardless of the example architecture, to provide for seamless sharing of devices, the current software (e.g., application) programs need not be changed in order to use the shared resources. To this end, device virtualization is provided as a model for device sharing. In one implementation, a hardware device of a shared remote computing machine (e.g., M1) is mapped to a local device if an application wants to use that device, with the mapped device referred to as a virtualized device that acts as a proxy between the application program and the (remotely-located) real physical device. Applications and other programs use the remote device by interacting with the virtualized device.

The control center user interface 224 allows a user to change settings and to control the aggregate computer system 100. For example, via the user interface 224, the user can plug and unplug remote devices, lock and unlock local devices, and so forth. In one implementation, the user interface 224 provides a representation of the organization of the aggregate computer system 100 and the status of each machine and/or device.

In general, the user interface 224 allows the user to change settings and take actions such as plug in or plug out remote devices. In one example implementation, the program's main message loop is also in the user interface 224, e.g., the function CreateTrayWindow( ). The user interface may be in any form, such as a popup menu on tray icon, or a full program window. When the aggregate device manager 252 first starts, it calls each component's initialization function to initialize, and then calls a function (e.g., CreateTrayWindow( )) to create the tray icon or other window and start the message loop. In order to link a menu item to a specified action, such as to plug in a remote device, a structure may be defined as follows:

```
typedef struct tagMENU_PLUG
{
  list_head list;
  LPTSTR lpDevice;
  DWORD deviceType;
  LPTSTR lpRemoteProvider;
  BOOL bLocalDevice;
} MENU_PLUG, *PMENU_PLUG;
```

The menu item of a certain kind of device operation action can be assigned to a pointer to this example structure.
The g_listMenuPlug is the list that records the structures created for the menu item for device operation action.

The configuration manager 250 saves and loads settings and configuration data related to the aggregate computer system 100. When the aggregate computer system 100 is started, the aggregate device manager 252 configures the aggregate computer system 100 according to any previous settings and configuration data, (at least to the extent that the configuration remains the same). When a setting is changed, the configuration manager 250 records that setting for the next incarnation, including after the aggregate computer system 100 is closed. Examples of information managed and saved for the aggregate computer system by the configuration manager 250 include a host name and a group name, the main channel's information, and remote provider's information. For example, the settings may be saved in a program directory (e.g., a config.ini) file, and when the system 100 starts, the configuration manager 250 loads the settings and each remote provider's address from that file. An example of such a file is set forth below:

```
[Channel Information]
APCName=APC1
[Options]
IsCloneScreen=0
IsDisplayFullScreen=1
[RemoteProviderAddress]
Enum=SCUT-500234764D, Media Center,
SCUT-500234764D#Interface=ViaIP
SCUT-500234764D#Type=1
SCUT-500234764D#Addr=02004B597F000001
Media Center#Interface=ViaIP
Media Center#Type=1
Media Center#Addr=02004B59AC174146
```

In the [Channel Information] section in the above example, the APCName is the name of aggregate computer system 100, and is also the group name. The settings are in the [Options] section. In the section [RemoteProviderAddress], the Enum field enumerates the remote device providers' name. The connection interface which the device provider is on, the machine type of the device provider, and its address on that connection interface are recorded in MachineName#Interface, MachineName#Type, MachineName#Addr fields, respectively.

In this example, a function LoadOptions( ) loads the options from the profile, and the function CfgSwitchXxx( ) switches the corresponding setting and writes the setting to the profile. The function CfgIsXxx( ) can be used to query the settings. A function LoadRemoteProvider( ) loads the remote device providers' information from the profile and a function SaveRemoteProvider( ) saves the remote device providers' information in the profile and the function. Whenever the settings are changed, the save function of the configuration manager 250 is called and the settings are saved in the configuration file. When the aggregate device manager 252 is shut down, the remote device providers' information is updated and saved in the profile. In general, the remote device provider's information is saved and loaded when the aggregate computer system 100 starts because this makes discovering other remote machines much faster than broadcasting messages on the network. This also makes it possible for two aggregate system machines to communicate with each other even they are not on the local area network, (whereby broadcasting messages to each other may fail). Note however that in such a situation, the remote provider's address needs to be added in the profile manually or via another user interface.

In this example, the Configuration Manager starts in CfgStartHost( ) and closes in CfgCloseHost( ). The local devices are added to the local device provider list in the function CfgStartHost( ). A first broadcast message is also sent in this function.

The aggregate device manager 252 records an identifier for each member (e.g., its address) of the aggregate computer system 100. When the aggregate computer system 100 is restarted, those members are remembered even if not discovered.

In general, the aggregate device manager 252 provides management for devices in the aggregate computer system 100; (additional details about one example aggregate device manager 252 are set forth below). The various computing machines that compose the aggregate computer system 100 cooperate by providing access to their hardware devices. In general, each hardware device connected to a machine of the aggregate personal computer 100 physically is regarded as a device of the whole aggregate personal computer system 100 (although it is feasible to limit access to any device). Any device may be utilized by any aggregate personal computing machine in this system 100 through the network connection. For example, the mouse of the local computing machine 110 can be used as a mouse of the remote computing machine D4, and vice-versa; the keyboard of D3 can be used as a keyboard of the device D2 and vice-versa, and so forth.

The aggregate device manager 252 thus controls the devices in each computing machine of the aggregate computer system 100. In one example architecture, the aggregate device manager 252 runs in the user mode of the operating system platform and communicates with the virtual bus driver 248 running in kernel mode. Management includes discovering and registering of physical devices, local and remote device management, device Plug-and-Play management, device connection and data transfer between aggregate computing machines. Management also includes local device broadcasting, connection maintenance between aggregate computing machines, and management of filter driver controllers and virtual driver controllers.

Connectivity to each other aggregate computing machine in the aggregate computer system 100 is provided by the aggregate connection manager 254; (additional details about one example aggregate connection manager 254 are set forth below). The aggregate connection manager 254 allows various connections (e.g., via connection modules) between the aggregate computing machines 102 and M1-Mn, to generally provide the same communication experience to other components, and in particular to the aggregate device manager 252, regardless of the actual connection type, e.g., via Ethernet, USB, Bluetooth, Wi-Fi, IrDA or any other connection mechanism.

In one example, the aggregate connection manager 254 provides various functionalities for the aggregate device manager 252. Such functionalities include registering and management of connection modules, establishing and terminating of communication channels, broadcasting information for the local computing machine, discovering communication channels of the other remote aggregate computing machines, and connection and data transfer between communication channels.

Figure 3:
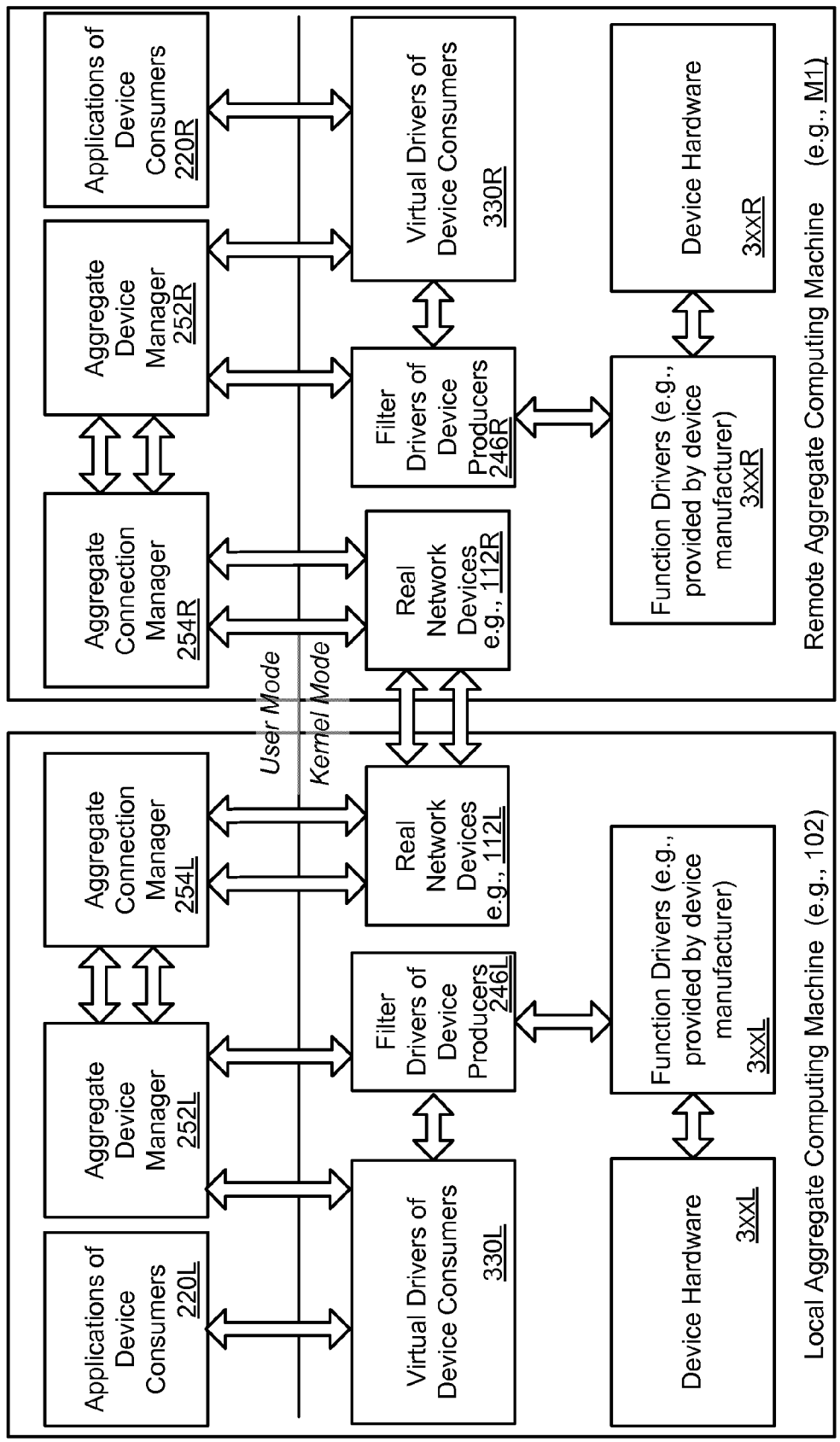
FIG. 3 is a block diagram representation of example components of two interconnected computing machines that participate as part of an aggregate computing system.

Turning to the aspects of remote device connection, as generally represented in FIGS. 2B and 3, when a remote device connection between two computing machines is established, the machine that has the real physical device connected provides its device to the other machine, and is referred to as a device provider; the other machine that uses the virtual device is called the device consumer. A computing machine may be a device consumer and a device provider at the same time. Note that in FIG. 3, the "L" in each component label represents the local component, and the "R" in each component label represents the remote counterpart component corresponding to that local component, but the "L" and "R" labels are omitted in the following description except where otherwise noted.

For each computing machine such as the local computer 102, the controllers 230 for virtual drivers run in user mode (in this example), and register virtual device drivers 330 to the aggregate device manager 252. In one aspect, the controllers 230 provide communication between the user mode aggregate device manager 252 and the kernel mode virtual device drivers 330. The virtual device drivers 330 run in kernel mode and report to the operating system as devices connected to the computing machine. As a result, consumer applications 220 running in the same (local) computing machine may operate the (remote) virtual hardware devices through the operating system APIs 222 and consider those virtual devices as if they were local physical devices. Operations between the applications 220 and the virtual devices are reported to the aggregate device manager 252 by the controllers 230 of virtual drivers 230, and those operations are transferred to the remote physical devices through the aggregate connection manager 254. Note that a virtual driver may be installed and run in the device consumer computer only after a remote device connection between two computing machines is established.

The consumer's virtual drivers 244 are implemented for each virtual driver component and run in kernel mode. They are developed for virtual devices and report to the operating system framework 106 (e.g., to system services 240) as real physical device drivers. In one example, the virtual drivers 244 are installed in a device consumer only once remote device connections between the consumer and one or more other aggregate computing machines are established.

After the virtual device drivers 244 are installed, applications 220 running in the operating system framework 106 may consider those virtual devices on the device consumers as physical devices and operate them through the operating system APIs 222. In turn, the APIs 222 call system services 240 which then call the virtual device drivers 244 to complete operations on the virtual devices. In general, the virtual device drivers 244 send commands and data to the real physical device in the other end of aggregate computer system 100, i.e., the device provider such as the machine M1 in FIG. 3, and then respond or return data from the provider. In general, the virtual device drivers 244 act like agents of the remote devices in other computing machines, and guarantee the data and command connection between the device consumers and the device providers.

The controllers 230 for filter drivers are implemented for each filter driver component, and run in user mode. The controllers 230 register filter device drivers with the aggregate device manager 252 and provide a communication path between the aggregate device manager 252 and their respective filter device driver (of the set of drivers 246) that run in kernel mode. The filter drivers directly control the physical devices in kernel mode.

When a remote device connection between two aggregate computing machines is established, each filter driver of the physical device transfers data between the device and the filter driver controller 230, and the filter driver controller 230 communicates with the aggregate device manager 252. In turn, the aggregate device manager 252 transfers device data to the other computing machine's (the consumer's) virtual driver.

The filter drivers 246 for the device providers are installed in device providers, run in kernel mode and are those developed for real physical devices and filter packets of real physical devices. When device providers provide physical devices to other computing machines, the filter drivers capture the data from physical devices and send them to the device consumer. As the filter drivers filter the packets, that machine's operating system no longer receives data packets from physical devices, whereby the physical devices appear to the device providers to have been disconnected ("plugged out"). Commands and output data packets from device consumers are sent to the physical device through the filter drivers. An advantage of using filter drivers rather than using application filtering is that the filter drivers run lower in kernel mode and it is safer because few applications can access their data.

In this example, virtual devices are used to control local hardwires, however classic buses require hardware support, and the connected devices should also have hardware. In order to be connected to the bus, the device's hardware should be designed according to the bus requirements. These concepts prevent such "virtual devices" (those without local hardware) from being connected and managed by these buses. To solve this problem, in one aspect a virtual bus that does not control any hardware is implemented so as to enable Plug and Play of virtual devices. Note that the virtual bus is a hypothetical bus that does not control any hardware; the devices connected to it also have no local hardware support.

A virtual bus driver 248 is provided for the virtual bus on which the virtual device drivers are installed. The aggregate device manager 252 communicates with virtual devices through the virtual bus driver 248. The virtual bus driver 248 controls data transfer between virtual devices and the aggregate device manager 252, controls the installation of virtual device drivers, controls virtual device registration to the operating system, and controls un-installation of the virtual devices from the operating system. The virtual bus driver 248 provides virtual device management and Plug-and-Play features of the aggregate computer system 100.

Various features of the virtual bus include that it controls no bus hardware, yet can attach virtual devices that do not have local hardware. The virtual bus can attach any kind of virtual device, and the connected device is regarded as a real device by the operating system.

Figure 4:
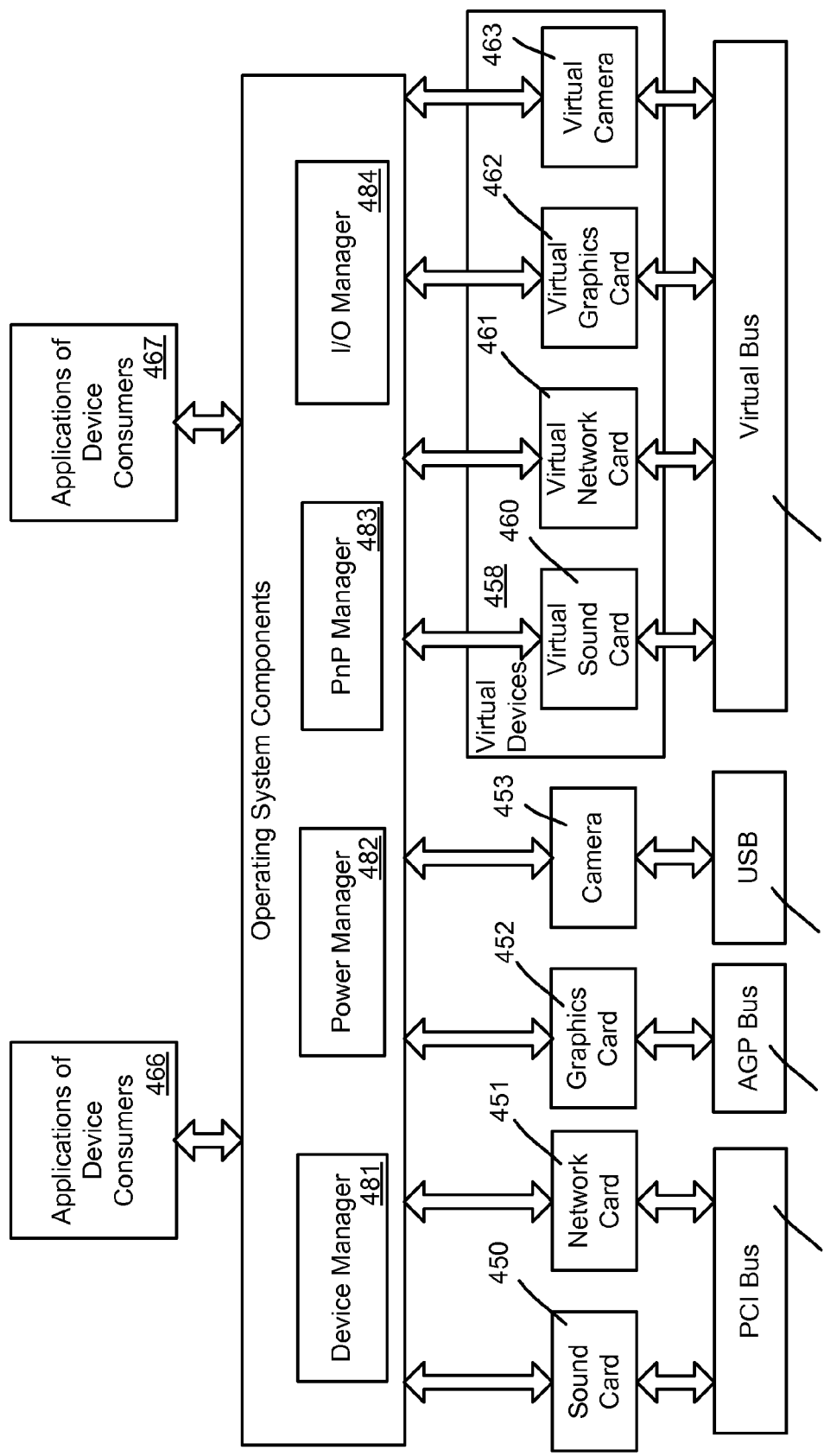
FIG. 4 is a block diagram representation of an aggregate computing system with example virtual devices connected thereto.

FIG. 4 describes a system that has several virtual devices connected to a virtual bus 444. The virtual bus 444 behaves just like other buses for the operating system, such as PCI, AGP and USB buses 440-442, respectively, however no hardware operations are involved in managing devices attached to virtual bus 444. One of the main responsibilities of a bus is to enumerate and control devices connected to it. For hardware buses, this is done electrically, however for virtual devices, the virtual bus manages device enumeration and control, and presents these devices to the operating system as real devices. Because no hardware is required for the bus and device, any kind of virtual devices can be attached to a virtual bus.

As represented in FIG. 4, the computer system includes real and virtual devices, with real devices exemplified by a sound card 450 and a network card 451 operating via the PCI Bus 440, a graphics card 452 operating via the AGP bus 441, and a camera 453 operating via the USB (external) bus 442. The virtual devices 458 operate via the virtual bus 444, and are exemplified by a virtual sound card 460, a virtual network card 461, a virtual graphics card 462 and a virtual camera 455.

The applications (two are shown labeled 466 and 467) of a device consumer are the applications which operate on devices. As is understood, the applications do not know whether the devices they are using are local devices or virtual devices.

Also represented in FIG. 4 is a device manager 481, which is a kernel component of the operating system that tracks loaded drivers and their interfaces. For example, the device manager 481 can notify the user when device interfaces become available and unavailable. The power manager 482 is also a kernel component of Windows® operating system responsible for managing power usage for the system. The power manager 482 administers the system-wide power policy and tracks the path of the power I/O request packets (IRPs) through the system. The PnP manager 483 includes a kernel-mode PnP manager and a user-mode PnP manager. The kernel-mode PnP manager interacts with operating system components and drivers to configure, manage, and maintain devices. The user-mode PnP manager interacts with user-mode setup components, such as Class Installers, to configure and install devices. The user-mode PnP manager also interacts with applications, for example to register an application for notification of device changes and notify the application when a device event occurs.

As also represented in FIG. 4, the I/O manager 484 is a core component of the operating system I/O subsystem. The I/O manager 484 exports I/O system services, which user-mode protected subsystems may call to carry out I/O operations on behalf of their applications and/or end users. In general, the I/O manager 484 intercepts these calls, sets up one or more IRPs, and routes them through possibly layered drivers to physical devices.

The operating system interacts with buses exclusively by the bus drivers, wherein a bus driver services a bus controller, adapter, or bridge. There is one bus driver for each type of bus in a machine; in general each bus driver enumerates the devices on its bus, responds to Plug and Play IRPs and power management IRPs, provides multiplex access to the bus, and generically administers the devices on its bus. A bus driver acts as the function driver for its controller, adapter, or bridge, and therefore manages device power policy for these components.

Figure 5:
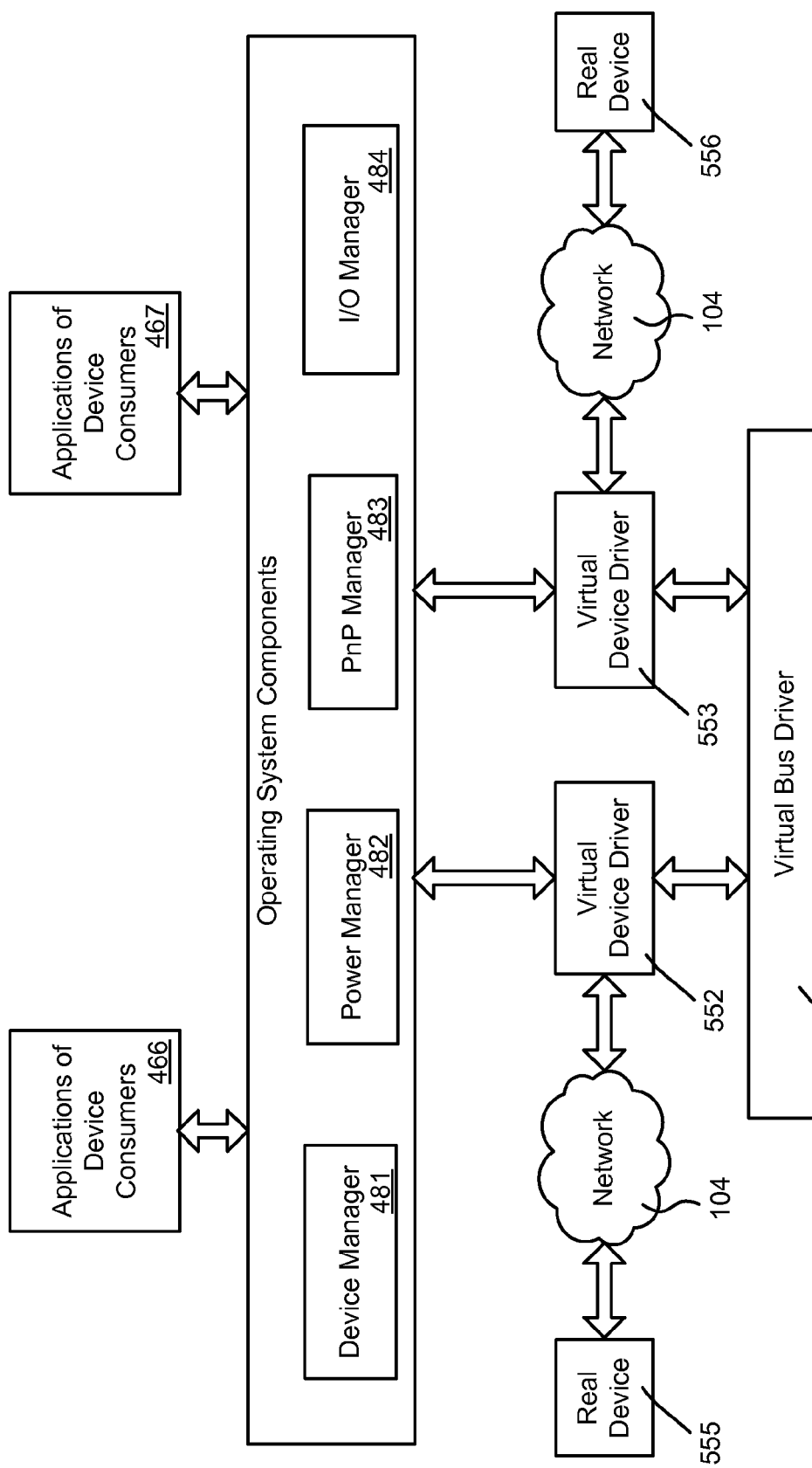
FIG. 5 is a representation of an example driver stack of a virtual bus.

As represented in FIG. 5, there is provided a virtual bus driver 550 to control the virtual bus 444 (FIG. 4). In general, the virtual bus 444 and virtual bus driver 550 fulfill the requirements of the operating system and manages connected virtual devices. FIG. 5 represents a typical driver stack when virtual devices are connected to the virtual bus 550 via their virtual device drivers 552 and 553. When the device manager 481 queries for a child device list of the virtual bus 444, two devices are reported. After loading the 552 and 553 for these child devices, the operating system is able to use these devices like other local devices. Because the virtual devices do not control hardware, the data processing is redirected to other places, rather than locally. For example, in FIG. 5, the virtual devices get or receive data through a network, with the data processing performed by the remote devices 555 and 556, respectively.

To summarize, the virtual bus driver 550 controls the virtual bus 444, communicates with the operating system and manages virtual devices. The virtual device driver 552 or 553 controls its virtual device and presents the virtual devices to the operating system as real devices, where, as set forth above, real devices 555 and 556 are physical devices connected to other computers or mobile devices among the network, and consumed by the virtual devices.

Figure 6:
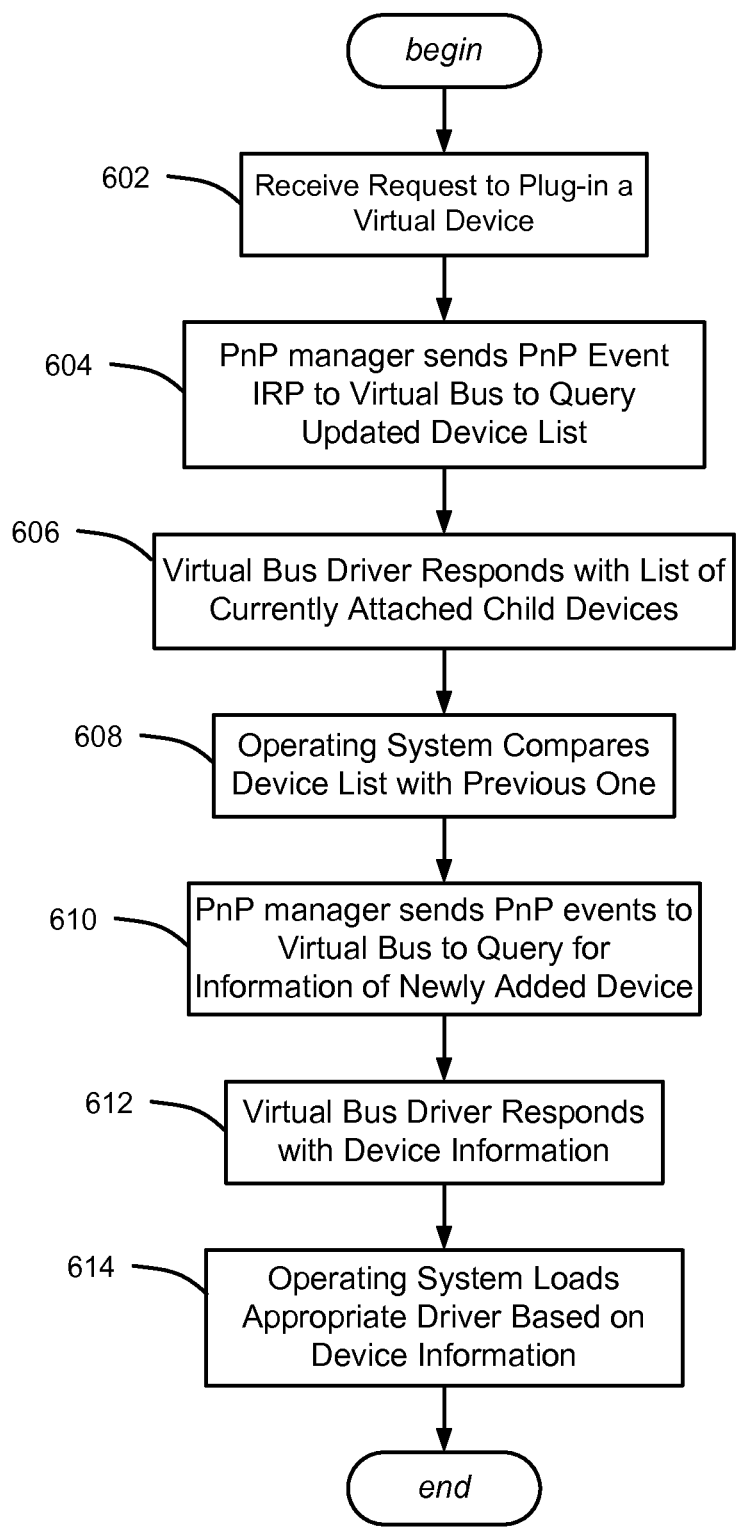
FIG. 6 is a flow diagram representing example steps that may be taken add a virtual device to an aggregate computer system.

Because a virtual bus 444 does not control hardware, plug and play is simulated to make the virtual devices usable. To this end, a series of steps are performed to prepare a virtual device for use. As represented in FIG. 6, example steps for plugging a new device into the virtual bus 444 include notifying the bus driver 450 to plug in a new device, e.g., via a user's request through an application (step 602).

In response, the virtual bus driver 550 creates a child PDO (Physical Device Object) for the virtual device, and keeps it in an internal list of children (child list), and reports a device relation change to the operating system.

At step 604, the PnP manager 483 sends a PnP event IRP to the virtual bus 444 to query the updated device list. The virtual bus driver 550 responds with an array of the currently attached child devices, as represented by step 606. By comparing (step 608) the device list with a previous one, the operating system recognizes that a new device has been connected, whereby at step 610 the PnP manager 483 sends a series of PnP events to the virtual bus 444 to query for detailed device information of the newly added device. The virtual bus driver 550 responds with the device information, as represented by step 612. According to the device information, at step 614 the operating system loads the appropriate driver (e.g., 552) for the newly added device.

At this time, the new device is ready for use, whereby the operating system is able to send data to or receive data from the virtual device like other local devices. Note again that because the virtual device does not have any hardware, the data processing should be done by other ways, such as by remote processing.

When a virtual device is removed, the PnP manager 483 sends a series of PnP events to the virtual bus driver 550 and the device driver (e.g., 552). The virtual bus driver 550 responds by removing the PDO of the corresponding child device from the internal child list, and destroys the PDO.

As can be seen, sending PnP events is one primary way for an operating system to communicate with the virtual bus driver 550 and query information about enumerated devices. The bus driver 550 is required to process some of these events, and respond with requested data.

Two types of PnP events include PnP events for the bus driver 550, and PnP events for the child PDO; the bus driver 550 needs to handle these types. Set forth below is one example as to how the virtual bus driver 550 handles these PnP events:

TABLE 1

| PnP events for bus driver: | |
| --- | --- |
| Name | Process |
| IRP_MN_QUERY_DEVICE_RELATIONS | Virtual bus driver handles BusRelations request for its FDO. The PnP manager sends this request to query the child devices when the device is enumerated and at other times while the device is active. The virtual bus driver handles it by returning a list of pointers to the PDOs of the connected child devices. |

TABLE 2

| PnP events for child PDO | |
| --- | --- |
| IRP_MN_QUERY_CAPABILITIES | When a device is enumerated, but before the function and filter drivers are loaded for the device, the PnP Manager sends this request to the parent bus driver for the device. The virtual bus driver handles it by setting the DEVICE_CAPABILITIES structure to specify the capabilities of the child device. |
| IRP_MN_QUERY_ID | There are four types of IDs the virtual bus driver handles: BusQueryDeviceID, BusQueryInstanceID, These two IDs are used to differentiate a device from other devices on the same machine. BusQueryHardwareIDs, BusQueryCompatibleIDs. These two IDs allow Setup to locate the appropriate drivers for the bus's child device. Virtual bus driver returns the IDs according to the child device type. |
| IRP_MN_QUERY_DEVICE_RELATIONS | The PnP manager sends this IRP to gather information about devices with a relationship to the specified device. Virtual bus driver handles this request for TargetDeviceRelation for its child devices. It returns the pointer to PDO for the specified child device. |
| IRP_MN_QUERY_DEVICE_TEXT | The PnP manager uses this IRP to get a device's description or location information. This string is displayed in the "Found New Hardware" pop-up window if no INF match is found for the device. Virtual bus driver returns a string description of the child device. |

TABLE 2-continued

PnP events for child PDO

| | |
|---|---|
| IRP_MN_QUERY_RESOURCES | The PnP manager uses this IRP to get a device's boot configuration resources. The virtual bus driver does nothing when processing this request because none of its child devices consume local resources. |
| IRP_MN_QUERY_RESOURCE_REQUIREMENTS | The PnP manager uses this IRP to get a device's alternate resource requirements list. The virtual bus driver does nothing when processing this request. |
| IRP_MN_QUERY_BUS_INFORMATION | The PnP manager uses this IRP to request the type and instance number of a device's parent bus. Virtual bus driver returns the request information. |

Turning to aspects related to networking, the network aggregate connection manager 254 for the aggregated computer system 100 provides a mechanism for applications on different machines that are connected by diverse networks to communicate with each other with unified experience. This includes connecting various kinds of computing machines, such as Desktop PCs, Laptops, Pocket PCs and/or Mobile phones, and seamlessly sharing I/O devices such as a mouse, keyboard, display and camera between these computers. However, because of the different features of these computers, network connection between them can be distinct, such as over Ethernet, WI-FI, Bluetooth or USB.

In general, the aggregate connection manager 254 hides the details of the underlying network physical mediums and topology structures, and provides a unified APIs for applications to communicate with each other transparently and efficiently.

In one example implementation, the aggregate connection manager 254 provides APIs for applications to communicate over a virtual named channel based on a client/server mode. Similar to named pipes, a virtual named channel is a named, duplex channel for communication between a channel server and one or more channel clients. The instances of a virtual named channel share the same pipe name, but each instance has its own buffers and handles, and provides a separate conduit for client-server communication. In general, the aggregate connection manager 254 hides the details of the underlying network including network type and network address, and provides a simple unified APIs for applications to communicate with each other, in an efficient way with respect to establishing a data connection, transferring data and checking network exceptions.

Figure 7:
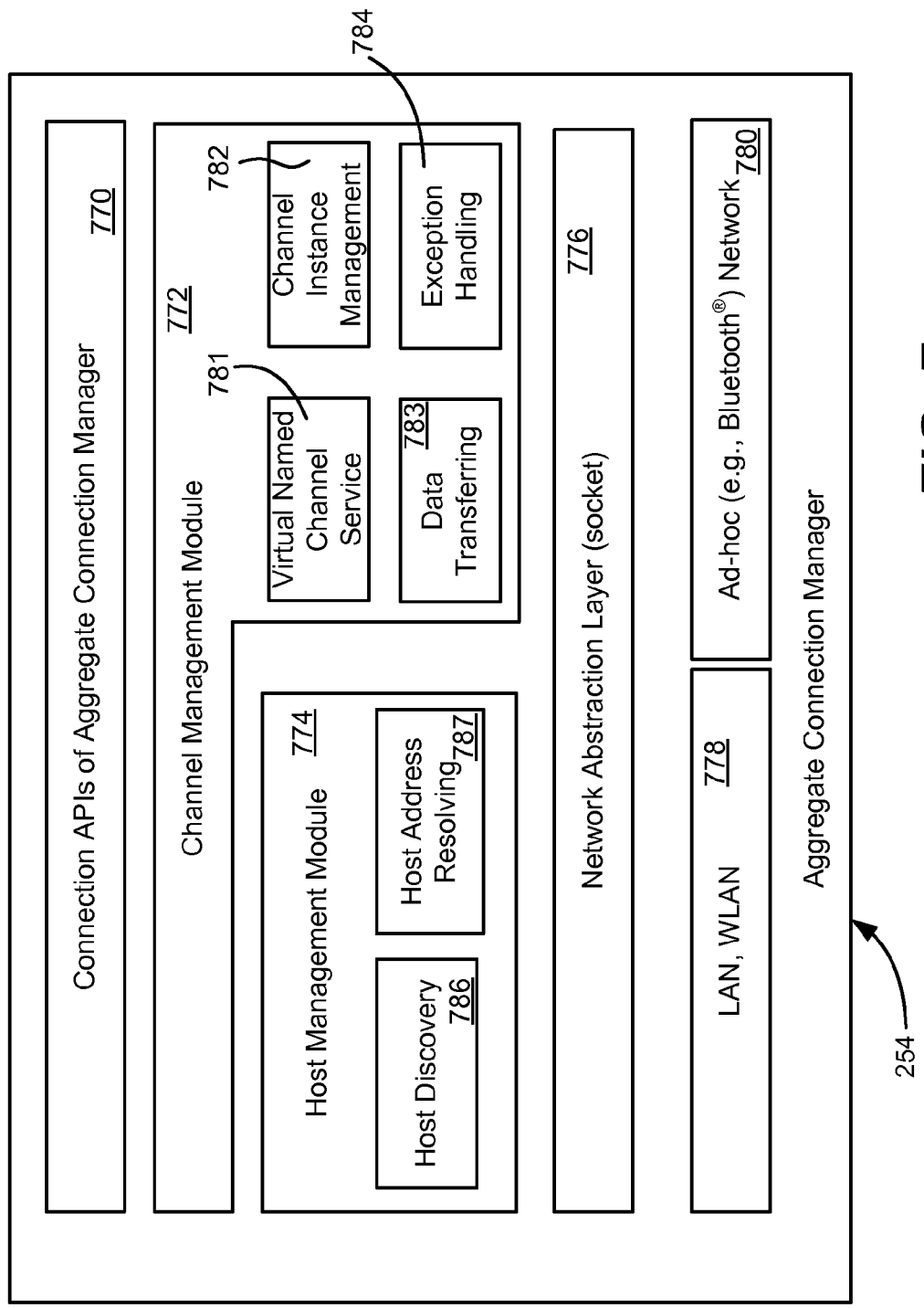
FIG. 7 is a representation of an example network connection manager architecture.

FIG. 7 describes an example architecture of one aggregate connection manager 254, comprising connection APIs 770, a channel management module 772 and a host management module 774. Note that FIG. 7 shows the modules/components as layered, with connections between layers omitted for purposes of clarity. Further note that the two levels at the bottom of the FIG. 7 (the components labeled 776, 778 and 780) are supported by the operating system. Note that in one example, the aggregate connection manager 254 may be built on Win-Sock 2.0.

The connection APIs 770 comprise a set of functions which can be called by applications; these functions may be linked into a single DLL with an additional exported library. The channel management module 772 contains sub-components 781-784 that provide the underlying implementation of the exported APIs.

Each virtual named channel can be viewed as a server which can be connected by one or more clients. These servers are managed by a virtual named channel service component 781. Channel instance management 782 manages the mapping relationship between created virtual named channel instances and the underlying sockets. Data transferring 783 controls how data is receive or sent over the virtual named channel. Exceptions and errors on virtual named channels are handled by an exception handling component 784.

The host management module hides the details of discovering available hosts in the network environment which is accomplished by host discovery component 786, and resolving network address of a host by host address resolving component 787.

Each virtual named channel has a unique name, e.g., with format as "//Servername/channel/channelname" where Servername is either the name of a remote computer or a period (or the like) that specifies the local computer. For example, when the channel server creates a virtual named channel, the ServerName is a period, e.g., //./channel/channelname.

When a client connects to a virtual named channel server, the name of the virtual channel is specified, where ServerName is the name of the remote computer. Available virtual named channels and their associated names can be enumerated by the connection APIs.

With respect to host discovery and virtual named channel enumeration, an application utilizing the connection APIs to communicate only needs to know the name of the virtual named channel with which to connect, and then connects with the channel, rather than resolving the virtual named channel to a connectable endpoint containing IP address and port number. To this end, such details are implemented in the aggregate connection manager 254, which is transparent to the upper levels.

The aggregate connection manager 254 implements a mechanism to get the dynamic view of the hosts joined to the aggregated computer system and their network addresses. If the underlying network is LAN or WLAN, IP multicast is utilized to discover hosts, while direct searching is performed if the underlying network is an Ad-hoc Bluetooth network.

When the aggregate connection manager 254 is initialized on a host in LAN or WLAN, the host joins a special multicast group, an IP multicast packet containing the host's network address is sent by the host management module to this special multicast group to indicate that this host is joining the aggregated computer system. Other hosts which have already joined the special multicast group and the aggregated computer system receive the multicast packet and reply directly to the original host with UDP packets to indicate their existence. After this process, the newly joined host and existing host discover each other.

The host management module 774 on each joined host sends a keep-alive multicast packet to the special multicast group (e.g., every few minutes) to indicate its existence. If a host is going to leave the aggregated computer system 100, the host management module 774 on that host sends a multicast packet to notify others of its leaving. However, IP multicast is not supported in Ad-hoc Bluetooth network, whereby available hosts and their network addresses need to be searched and discovered directly by the host management module 774. The discovery process may be repeated (e.g., every few minutes) to discover newly joined hosts and remove hosts that have left.

To let applications know which virtual named channels have been created in the aggregated computer system environment before connecting with one channel, a function is provided by the connection APIs 770 to enumerate the available virtual named channels. In one example implementation, the channel management module 772 sends a request to each available host for requiring information about the created virtual named channels on this host, such as channel name, channel properties, and channel endpoint address (IP and port). The information is saved in a local cache and returned to the user. For better performance, the content of the cache may be directly returned (without doing actually querying) when the application enumerates available virtual named channels.

A virtual named channel as a server is associated with an actual server socket and listens on that server socket before any client can connect with the channel. In one implementation, a TCP server socket bound on a distinct port is created for each virtual named channel, as managed by the virtual named channel service component.

Communication between the channel server and a client is based on a virtual named channel instance, which is implemented as a wrapper of a low-level TCP socket object managed by the operating system. When a client is connecting to a server channel, an underlying TCP socket is created and connects with the TCP server socket of the server channel. Then, the underlying TCP socket is wrapped by a virtual named channel instance which is used by the client to communicate with the server.

At the server side, a TCP socket is created each time a client connects; the created TCP socket is then wrapped by a virtual named channel instance which is used by the server application to communicate with the client. However, the underlying sockets on both sides are responsible for actually transferring the data through this channel. The relationship between the virtual named channel instance and the underlying socket is managed by the channel instance management component. Exceptions and errors occurring on the underlying socket are reflected on the corresponding virtual channel instance, and applications are notified about such exceptional events.

A virtual named channel instance can be operated in blocking mode or non-blocking mode. In blocking mode, reading and sending operations are blocked until there is data to be read from the channel or the data sent to the channel has been sent out. While in non-blocking mode, reading and sending operations return immediately and the actual operations on the instance are finished in an asynchronous way.

A virtual named channel instance can be message based or byte-stream based. When the channel instance is message based, a basic unit of data operated on this channel instance is a well-defined message. For example, a reading operation is blocked until the whole message including message header and data content has reached on the channel instance; also a sending operation is blocked until all parts of the message has been sent out through the channel instance. Message-based channel instance is operated in blocking mode.

When the channel instance is byte-stream based, a basic unit of data operated on the channel instance is a byte. A byte-stream based channel instance can be operated in blocking mode or non-blocking mode.

The connection APIs comprise a set of functions used for communicate between applications. The following functions are supported in one example, (where the term "Server" refers to the application that creates a channel server and is listening for clients, and the term "Client" refers to the application that connects to a channel server).

CmInit( );
    Initialize Network Connection Manager. Server or Client.
CmRelease( );
    Release the associated resources with Network Connection Manager. Server or Client.
CmCreateChannel( );
    Create a virtual named channel. Server only.
CmDestroyChannel( );
    Destroy a virtual named channel. Server only.
CmOpenChannel( );
    Wait for incoming connection to the virtual named channel and open a channel instance on the virtual named channel to connect with the client. Server only.
CmCloseChannel( );
    Close a channel instance and close the connection with the client. Server only.
CmConnectChannel( );
    Connect to a virtual named channel. Client only.
CmDisconnectChannel( );
    Disconnect to a virtual named channel. Client only.
CmReadChannel( );
    Read data from a virtual named channel instance. Server or Client.
CmWriteChannel( );
    Write data to a virtual named channel instance. Server or Client.
CmEnumChannels( );
    Enumerate all the available virtual named channels and return their names. Client only.
CmGetChannelInfoByName( );
    Retrieve information about a virtual named channel by its name. Server or Client.
CmGetChannelInfoByHandle( );
    Retrieve information about a virtual named channel by its handle. Server only.

By way of example using code samples a server typically operates as follows when using the APIs:

```
CmInit( );
CmCreateChannel( );
CmOpenChannel( );    // block until a client connects with
                     // channel;
...
    // call CmReadChannel( )/CmWriteChannel to communicate
```

-continued

```
// with the client;
...
CmCloseChannel( );
CmDestroyChannel( );
CmRelease( );
```

A client typically operates as follows when using the APIs:

```
CmInit( );
CmConnectChannel( ); // block until connection is finished;
...
// call CmReadChannel( )/CmWriteChannel to communicate with
// the server;
...
CmDisconnectChannel( );
CmRelease( );
```

A client also may call CmEnumChannels( ) to get the available virtual named channels and then call CmConnectChannel( ) to connect with one of them.

Turning to various aspects of communication, the aggregate computer system 100 is not a fixed computer system, but rather is adaptable to changes of the number of computing machines as well as to changes of computer members' network addresses. The computing machines in the system discover each other by broadcasting or multicasting on the network. To this end, when a computing machine is started, the device broadcasts its network address and its brief information to the other computing machines on the network. When one device receives the broadcast message from another device, the receiving device thus knows the sending device's network address and can connect to the sender device to retrieve further information and establish a connection. In this way, every computing machine member in the aggregate computer system 100 can discover each other by broadcasting and receiving the broadcast message from each other.

The adaptation to device changes is like the Plug-and-Play in a single computer. Whenever a device is plugged in or plugged out, locked or unlocked by the device provider, the aggregate computing machine involved broadcasts a message to notify others to update its device list.

The devices in each computing machines can be switched and connected to others through network communication. As the devices in the system communicate with the system by digital data, the aggregate computer system 100 connects devices on different computers by digital data transfer between them. The device provider uses filter drivers to capture device data and send them to a remote device consumer through network. Via virtual device drivers, the device data from the device provider are sent to the operating system on the device consumer. Then the system provides the device to the applications running in the system.

The aggregate device manager 252 provides management for devices in the aggregate computer system. Different machines that compose the aggregate computer system need to cooperate with their devices. In general, each device physically connected to an aggregate computer system 100 is regarded as being a device of the whole aggregate computer system 100, which can be utilized by any aggregate computing machine in the system through a network connection. The aggregate device manager 252 controls the devices in each aggregate computer system 100 by providing management related to physical device discovering and registering, local and remote device management, device Plug-and-Play management, device connection and data transfer between computing machines, remote device discovering, local device broadcasting, connection maintenance between computing machines, management of filter driver controllers, and management of virtual driver controllers.

With respect to physical devices discovering and registering, the discovering process is completed by calling VmUpdateLocalDeviceList( ) in each filter driver controller. Whenever the controller of the filter driver find a new physical device newly connected to the system, the controller calls VmUpdateLocalDeviceList( ) to let the aggregate device manager 252 update the local device list. This function calls each filter driver controller's query device list function to query the current device list and add each local device to the local device list. After getting the local device lists from each filter driver controller, the aggregate device manager 252 calls BroadcastLocalDeviceListUpdated( ) to broadcast a message indicating that this aggregate machine's device list has been updated.

When an aggregate computing machine starts, it calls each filter driver controller's query device list function to query the device list and add each local device to the local device list. Note that the display's filter driver controller will only report a fixed display device named "Primary Monitor." Other devices' filter driver controllers will report devices found in the system, and their name in the operating system, respectively.

After the aggregate device manager 252 gets the local device lists from each filter driver controller, the aggregate device manager 252 calls VmAddLocalDeviceProvider( ) to add devices in the local device list. Two lists, g_listLocalDevices and g_listRemoteProviders, hold the local and remote device lists in the aggregate device manager 252. The list member of g_listLocalDevices is the type of PLOCAL_DEVICE_LIST_ENTRY. It is a pointer to LOCAL_DEVICE_LIST_ENTRY structure that records the local device's type, name, handle, status, consumer's name, provider channel and communication channels linked to it, and is defined as follows:

```
typedef struct tag_LOCAL_DEVICE_LIST_ENTRY
{
    struct list_head    list;
    HANDLE              hChannel;           // provide on which channel
    DWORD               deviceType;         // type of device, starting from 1
    HANDLE              hAppHandle;         // device handle for device
                                            // related application
    LPTSTR              lpDeviceName;       // device name, can't be NULL
    DWORD               dwStatus;           // status: DEVICE_LOCKED,
                                            // DEVICE_PLUGGED_OUT
    LPTSTR              lpConsumer;         // consumer's name, can't be NULL,
                                            // " " at least,
                                            // may be deleted if share mode
    struct list_head    listChannelInstance;    // channel instances
                                                // linked, more than one
                                                // if in share mode
    //DWORD             dwAccess;           // read/write/password
                                            // protected, etc.
    //LPTSTR            lpPassword;         // password to use this device
    BOOL                bPresent;           // Mark whether the device is still
                                            // present
} LOCAL_DEVICE_LIST_ENTRY,
*PLOCAL_DEVICE_LIST_ENTRY;
```

The list member of g_listRemoteProviders is the type of PREMOTE_PROVIDER_ENTRY. It is a pointer to REMOTE_PROVIDER_ENTRY structure which records remote provider's handle, name, machine type, device list, and is defined as follows:

```
typedef struct tag_REMOTE_PROVIDER_ENTRY
{
    struct list_head    list;
    HANDLE              hProvider;          // handle of provider
    LPTSTR              lpProviderName;     // name of provider
    DWORD               dwMachineType;      // type of provider's machine
    int                 nDevices;           // number of devices
    PDEVICE_INFO        devices;            // array of devices
    BOOL                bPresent;           // mark whether the provider
                                            // is still present
} REMOTE_PROVIDER_ENTRY, *PREMOTE_PROVIDER_ENTRY;
typedef struct tag_DEVICE_INFO
{
    LPTSTR              lpDeviceName;
    DWORD               dwDeviceType;
    DWORD               dwStatus;           // status: DEVICE_LOCKED,
                                            // DEVICE_PLUGGED_OUT
    LPTSTR              lpConsumer;
    //struct list_head  listConsumers;
} DEVICE_INFO, *PDEVICE_INFO;
```

There are two pairs of functions which can add or delete the list members of g_listLocalDevices and g_listRemoteProviders:

```
VmAddLocalDeviceProvider( ) and VmDeleteLocalDeviceProvider( );
AddRemoteProviderEntry( ) and RemoveRemoteProviderEntry( ).
```

These functions add or delete the list members of g_listLocalDevices and g_listRemoteProviders. Example places where they are called are set forth below:

```
VmAddLocalDeviceProvider( ):
    CfgStartHost( ) when host is started
    VmUpdateLocalDeviceList( ) when local device list is updated.
VmDeleteLocalDeviceProvider( ):
    EndUpdateLocalDeviceList( ) when local device is disappeared.
AddRemoteProviderEntry( ):
    VmFoundNewProvider( ) when a new device provider is found.
RemoveRemoteProviderEntry( ):
    UIChangeGroup( ) which needs to clear all providers after
    group is changed.
    ConnectionMaintainThread( ) when the provider disappeared.
```

VmDeleteLocalDeviceProvider( ) and RemoveRemoteProviderEntry( ) are also called in MainRouting( ) to release memory when the aggregate device manager 252 is going to be shut down.

Device Plug-and-Play features are based on the operating system and the controllers of the filter drivers for physical devices. When a Plug-and-Play device is connected to the aggregate computer system 100, the controller of the filter driver for that particular kind of device receives a notification from the operating system and calls VmUpdateLocalDeviceList( ) to notify the aggregate device manager that the local device list should be updated. The aggregate device manager registers this newly added device to the local device list and broadcasts a message that the local device list in the aggregate computer system 100 has been updated, in order to let other computing machines of the aggregate computer system 100 retrieve the updated device list.

The broadcast is completed by calling a function, e.g., CmQueryChannels( ), which is also the function that broadcast the network address to other computing machines. In one example implementation, the broadcast message comprises a UDP packet in "ViaIP" connection module, and is exemplified as follows:

```
typedef struct tag_PROVIDER_INFO_UDP_PACKET
{
    DWORD   dwFlag;          // PROVIDER_INFO_FLAG or QUERY_PROVIDER_INFO_FLAG
    DWORD   dwStatus;        // status of the provider
    DWORD   dwPort;          // port number
    DWORD   dwMachineType;   // machine type
    DWORD   cbMachineName;   // size of characters in machine name
    TCHAR   szMachineName[1];// characters of machine name
} PROVIDER_INFO_UDP_PACKET, *PPROVIDER_INFO_UDP_PACKET;
```

After other computing machines receive the broadcast message, they attempt to retrieve the device list from the computer that sent the message. Because the broadcast message is sent after the device list has been updated, the other computing machines will get the updated device list. In this manner, the device list in the various computing machines of the aggregate computer system 100 is refreshed, whereby and the plugged-in Plug-and-Play device can be provided to any remote aggregate computing machine.

Local devices are published to other remote computing machines by broadcasting. In order to save network load, each computing machine in the aggregate computer system 100 broadcasts its device provider information in a UDP packet rather than broadcasting the entire device list. Because only brief provider information is provided in the broadcast message, the receiver of the message needs to connect to the device provider to retrieve the provider's device list.

After receiving the broadcast message from other computing machines, the aggregate device manager 252 tries to retrieve the device list information from the device providers. The aggregate connection manager 254 first receives the broadcast message and then calls a function, e.g., VmFoundNewProvider( ), which has been registered by the aggregate device manager 252 as a callback function. In VmFoundNewProvider( ), the aggregate connection manager 254 connects to the device provider and sends a control code (e.g., VM_CTL_QUERY_DEVICE_INFO) to query the device list information. In one example, the data returned from the device provider is as follows:

```
                    // data sent by device provider
DWORD       dwDeviceNum;    // number of devices
DEVICE_INFO_LIST
    {
            LONG     cbDeviceName;       // size of the first device
                                         // name string
            TCHAR    szDeviceName[ ];    // the first device name
            DWORD    dwDeviceType;       // device type
            DWORD    dwStatus;           // status: DEVICE_LOCKED 0x1,
                                         // DEVICE_PLUGGED_OUT 0x2
            LONG     cbConsumerName;         // size of consumer name
            TCHAR    szConsumerName[ ];      // if no consumer, it's ""
            LONG     cbDeviceName;           // size of the second device
                                             // name string
            TCHAR    szDeviceName[ ];    // the second device name
            DWORD    dwDeviceType;       // device type
            DWORD    dwStatus;           // status: DEVICE_LOCKED 0x1,
                                         // DEVICE_PLUGGED_OUT 0x2
            LONG     cbConsumerName;         // size of consumer name
            TCHAR    szConsumerName[ ];      // if no consumer, it's ""
            ...                          // other devices' information
    };
```

After receiving the device list from the device provider, the aggregate device manager 252 calls a function, e.g., AddRemoteProviderEntry( ), to add the remote provider entry to the remote provider list, and then sends a disconnect control code to the provider to disconnect.

When the device consumer is going to plug in a remote device, the device consumer calls a function, e.g., VmCreateLink( ), to create a link between the remote device and the aggregate device manager 252 of the device consumer. In this function, the device consumer first sends a control code (e.g., VM_CTL_ADD_LINK) and then sends the data, which is one example implementation is as follows:

```
    {
        DWORD dwDeviceType;        // device type
        LONG cbDeviceName;         // size of device name string
        TCHAR szDeviceName[ ];     // device name
    }
```

The device provider receives the request in a function, e.g., VmAcceptThread( ), and processes this request in another function, e.g., VmAddLink( ). In the VmAddLink( ) function, the device provider checks whether the requested device is available to provide to the device consumer. If the check passes, the device provider returns an "accept" answer code (e.g., 0) to accept the request. After the consumer receives the accept code, the consumer allocates a list entry, e.g., of the type DEVICE_LINK_ENTRY, and adds the entry to the device link list, e.g., g_listDeviceLinks. In one example implementation, DEVICE_LINK_ENTRY is defined as follows:

```
typedef struct tag_DEVICE_LINK_ENTRY
{
    struct list_head  list;              // list entry head
        HANDLE        hChannelInstance;  // communication channel
                                         // handle
        LPTSTR        lpProvider;        // device provider name
        LPTSTR        lpDevice;          // device name
        DWORD         deviceType;        // device type
        HANDLE        hThread;           // handle of thread for
                                         // linkage
} DEVICE_LINK_ENTRY, *PDEVICE_LINK_ENTRY;
```

Once the device connection information is recorded in the device link list (e.g., g_listDeviceLinks), the device consumer creates a thread, e.g., by calling a VmLinkRemoteDeviceThread( ) function. The device consumer first tries to install the virtual driver by calling a function (e.g., PluginDevice( )) provided by the virtual bus.

Because each virtual device is assigned a serial number before calling the PluginDevce( ) virtual bus function, the aggregate device manager 252 maintains a serial number pool for virtual devices. In one example implementation, the serial number pool comprises an array as set forth below:

```
BYTE        g_fbDeviceSN[ DEVICE_TYPE_SUPPORTED+1 ][
            32 ];
            // support 256 devices for each type;
            // serial number 0 for each type is reserved
```

Example functions for allocating and releasing serial numbers from the serial number pool are set forth below:

```
/*//////////////////////////////////////////
//
//`  Description:
//       Allocate a new serial number from flagbits;
//
//   Arguments:
//       flagbits   - pointer to bits stored allocated serial
number
//       size       - the size of flagbits, in bytes
//
//   Return Value:
//       Serial number;
//
*/
int AllocSN( BYTE* flagbits, int size );
/*//////////////////////////////////////////
//
//`  Description:
//       Free serial number from flagbits;
//
//   Arguments:
// flagbits - pointer to bits stored allocated
// serial number
//       sn         - serial number
//
//   Return Value:
//       None;
//
*/
void FreeSN( BYTE* flagbits, int sn );
```

As described above, after the virtual device is plugged in by PluginDevice( ), the virtual bus 444 notifies the operating system that a device is plugged in, whereby the operating system attempts to install the virtual driver of this device.

When the virtual driver is installed, the aggregate device manager 252 of the device consumer communicates with the device provider and transfers data from the device consumer to the virtual driver.

When the device provider returns an accept answer code (e.g., 0) to accept the request in the appropriate function, e.g., VmAddLink( ), the device provider sets the local device's status to "being used" status, e.g., DEVICE_PLUGGED_OUT, and broadcasts a message to tell other computing machines that the device list has been updated. The device provider opens the local device by calling an open device function provided by controller of device filter driver and starts to transfer data between the controller of this device filter driver and the device consumer's aggregate device manager 252. Example control codes are listed below:

```
#define VM_CTL_QUERY_MACHINE_INFO 0x00000010
#define                              0x00000011   // query
VM_CTL_QUERY_DEVICES                              info
                                                  // value
                                                  // should be < 0x100
#define VM_CTL_ADD_LINK              0x00000101   // action
                                                  value
                                                  // should be > 0x100
#define VM_CTL_DELETE_LINK           0x00000102
#define                              0x00000103
VM_CTL_SWITCH_DESKTOP
#define VM_CTL_SWITCH_BACK           0x00000104
#define                              0x00000105
VM_CTL_PLUG_IN_DEVICE
#define                              0x00000106
VM_CTL_PLUG_OUT_DEVICE
```

In one example implementation, the device types are defined as follows:

```
//
// Device type constants, type 0 is reserved
//                                       // number of device types
#define DEVICE_TYPE_SUPPORTED    4       // supported
#define VM_DEVICETYPE_DISPLAY            0x00000001
#define VM_DEVICETYPE_KEYBOARD           0x00000002
#define VM_DEVICETYPE_MOUSE              0x00000003
#define VM_DEVICETYPE_CAMERA             0x00000004
#define VM_DEVICETYPE_SPEAKER            0x00000005
```

In one example implementation, the machine types are defined as follows:

```
#define VM_MACHINETYPE_PC       0x00000001
#define VM_MACHINETYPE_PDA      0x00000002
#define VM_MACHINETYPE_PHONE    0x00000003
```

Note that when the machine type is VM_MACHINETYPE_PDA, the VmAddLink( ) calls VmProcessDevicesForMobile( ) to process the data connection between the computer and a personal digital assistant (PDA) because it is different to connect devices from computer to PDA.

In one example implementation, the device messages are defined as follows, where the message codes are used in data transfer for device connection:

```
//
// Device message definition
//
#define DEVICE_MOUSE_DATA_MSG        0x00000003
#define DEVICE_KEYBOARD_DATA_MSG     0x00000004
#define DEVICE_SCREEN_DATA_MSG       0x00000005
#define DEVICE_PRINT_SCREEN_MSG      0x00000006
```

-continued

```
#define DEVICE_CAMERA_DATA_MSG       0x00000007
#define DEVICE_CAMERA_PC_DATA_MSG    0x00000008
#define DEVICE_DISPLAY_DATA_MSG      0x00000009
#define DEVICE_DISPLAY_NOT_EXIST_MSG 0x0000000A
#define DEVICE_DISPLAY_FULL_SCREEN   0x0000000B
#define DEVICE_DISPLAY_WINDOWED      0x0000000C
#define DEVICE_DISPLAY_NULL          0x0000000D
```

In order to dynamically update the aggregate computer system 100 list in the control center user interface, there is a thread (e.g., ConnectionMaintainThread( )) created for connection maintenance between computing machines. This thread tries to connect each computing machine in the device provider list to see whether the device provider is still connectable. If the connection attempt fails, that is, the device provider has disappeared in the network, the device provider is removed from the device provider list. In one example, the thread waits for fifteen seconds after every provider in the list is checked.

The aggregate device manager 252 maintains a list of filter driver controllers' interface, which in one example is defined as follows:

```
VM_APP_INTERFACE g_AppInterface[
    DEVICE_TYPE_SUPPORTED+1 ];
        // device_type 0 reserved
```

In one example, a function, e.g., VmAppRegister( ), is used for filter driver controllers to register their interface:

```
int VmAppRegister( PVM_APP_INTERFACE vmAppInterface,
    DWORD deviceType );
```

In one example, related structures for device types are defined as follows:

```
typedef struct tag_VM_APP_INTERFACE
{
    PVM_APP_OPEN          appOpen;
    PVM_APP_CLOSE         appClose;
    PVM_APP_READ          appRead;
    PVM_APP_WRITE         appWrite;
    PVM_APP_QUERY_LIST    appQueryList;
    PVM_APP_QUERY_NAME    appQueryName;
} VM_APP_INTERFACE, *PVM_APP_INTERFACE;
```

In one example, the related types are defined as:

```
//
// Open device by handle
//    handle - the handle to the device
//
// Returns:
//    Zero - successful
//    Nonzero - failure
//
typedef int (*PVM_APP_OPEN) ( HANDLE handle );
//
// Close device by handle
//    handle - the handle to the device
//
// Returns:
//    Zero - successful
//    Nonzero - failure
//
typedef int (*PVM_APP_CLOSE) ( HANDLE handle );
//
```

```
// Read data from device
//    handle       - the handle to the device
//    buf          - data buffer
//    size         - size of buffer
//
// Returns:
//    Positive - number of bytes read from the device
//    Zero or negative - failure
//
typedef int (*PVM_APP_READ) ( HANDLE handle, BYTE*
buf, DWORD size );
//
// Write data to device
//    handle       - the handle to the device
//    buf          - data buffer
//    size         - size of data in buffer
//
// Returns:
//    Positive     - number of bytes written to the device
//    Zero or negative - failure
//
typedef int (*PVM_APP_WRITE) ( HANDLE handle, BYTE*
buf, DWORD size );
//
// Query device list
//    handle - pointer to a handle array which receives the handle
// list,
//        the number of handles should be less than 128
//
// Returns:
//    Positive - number of handles in the list
//
typedef int (*PVM_APP_QUERY_LIST) ( HANDLE* handle );
//
// Query device name
//    handle       - the handle to the device
//
// Returns:
//    Nonzero - a pointer to device name, it won't be released
//    outside
//
typedef LPCTSTR (*PVM_APP_QUERY_NAME) ( HANDLE
handle );
```

Each filter driver controller calls a function, e.g., VmAppRegister( ), to register its interface as part of its initialization function. Note that the aggregate device manager 252 calls each filter driver controller's initialization function, e.g., in VmServerInit( ).

The aggregate device manager 252 maintains a list of virtual driver controllers' interfaces, which in one example is defined as follows:

```
VM_DRV_INTERFACE g_DrvInterface[
DEVICE_TYPE_SUPPORTED+1 ];
// device_type 0 reserved
```

The VmDrvRegister( ) function is used for virtual driver controllers to register their interfaces. In one example, it is defined as:

```
int VmDrvRegister( PVM_DRV_INTERFACE vmDrvInterface,
DWORD deviceType );
``` with related structures for device types defined as follows:

```
typedef struct tag_VM_DRV_INTERFACE
{
    PVM_DRV_CREATE    drvCreate;
    PVM_DRV_CLOSE     drvClose;
    PVM_DRV_READ      drvRead;
```

```
    PVM_DRV_WRITE     drvWrite;
} VM_DRV_INTERFACE, *PVM_DRV_INTERFACE;
and related types defined as follows:
//
// Create a virtual device
//
// Returns:
//    Positive - the handle to the device created
//
typedef HANDLE (*PVM_DRV_CREATE) ( );
//
// Close a virtual device
//    handle    - the device handle
//
// Returns:
//    Zero - successful
//    Nonzero - failure
//
typedef int (*PVM_DRV_CLOSE) ( HANDLE handle );
//
// Read data from the virtual device
//    handle    - the device handle
//    buf       - the data buffer
//    size      - size of the data buffer
//
// Returns:
//    Positive - number of bytes read from the device
//    Zero or negative - failure
//
typedef int (*PVM_DRV_READ) ( HANDLE handle, BYTE* buf,
DWORD size );
//
// Write data to the virtual device
//    handle    - the device handle
//    buf       - the data buffer
//    size      - size of the data buffer
//
// Returns:
//    Positive - number of bytes written to the device
//    Zero or negative - failure
//
typedef int (*PVM_DRV_WRITE) ( HANDLE handle, BYTE* buf,
DWORD size );
```

Each filter driver controller calls VmDrvRegister( ) to register its interface in the initialization function. Note that the aggregate device manager 252 calls each filter driver controller's initialization function, e.g. in VmServerInit( ).

The aggregate connection manager 254 provides connectivity between each computing machine of the aggregate computer system 100. The aggregate connection manager 254 provides for various kinds of connections between computing machines, whereby the aggregate device manager 252 may communicate in the same way whether a device is connected via Ethernet, USB, Bluetooth, Wi-Fi, IrDA or another connection. To this end, the aggregate connection manager 254 as different connection modules and provides connection module registering and management. The aggregate connection manager 254 such as connection modules registering and management, communication channel establishing and terminating, broadcasting of local aggregate computer system 100, discovering communication channels of other computing machines and connection and data transfer between communication channels.

When the aggregate connection manager 254 starts, a function (e.g., CmInitialize( )) is called to initialize each connection interface. In initialization function of each connection interface module, the RegisterCmInterface( ) should be called to register the connection interface. It is defined by:

```
HANDLE RegisterCmInterface( LPCTSTR lpInterfaceName,
PCM_INTERFACE cmInterface );
```

In one example, related structures and types are defined by:

```
typedef struct tag_CM_INTERFACE
{
    PCM_QUERY_CHANNEL         cmQueryChannels;
    PCM_CREATE_CHANNEL        cmCreateChannel;
    PCM_DESTROY_CHANNEL       cmDestroyChannel;
    PCM_OPEN_CHANNEL          cmOpenChannel;
    PCM_CLOSE_CHANNEL         cmCloseChannel;
    PCM_CONNECT_CHANNEL       cmConnectChannel;
    PCM_DISCONNECT_CHANNEL    cmDisconnectChannel;
    PCM_DISABLE_CHANNEL       cmDisableChannel;
    PCM_READ_CHANNEL          cmReadChannel;
    PCM_WRITE_CHANNEL         cmWriteChannel;
} CM_INTERFACE, *PCM_INTERFACE;
//
// Query channels
//      Query what channels are opened by others
//
typedef
void
(*PCM_QUERY_CHANNEL) ( );
//
// Create a channel
//
typedef
int
(*PCM_CREATE_CHANNEL) (
    PCM_CHANNEL_ENTRY pChannelEntry
    );
typedef struct tag_CM_CHANNEL_ENTRY {    // entry of channel list
    struct list_head          list;                 // list head entry
    LPTSTR                    lpChannelName;        // name of channel
    PCM_CALLBACK_ACCEPT       cmCallbackAccept;     // pointer to
                                                    // callback function of accept
    CM_CHANNEL_INFO           channelInfo;          // channel's information
    struct list_head          listSubChannel;       // future use
} CM_CHANNEL_ENTRY, *PCM_CHANNEL_ENTRY;
typedef void (CALLBACK *PCM_CALLBACK_ACCEPT) ( HANDLE
hChannelInstanceHandle );
typedef struct tag_CM_CHANNEL_INFO
{
    TCHAR    szGroupName[256];
    TCHAR    szDescription[1024];
    DWORD    dwProperty;
} CM_CHANNEL_INFO, *PCM_CHANNEL_INFO;
//
// Destroy a channel
//
typedef
int
(*PCM_DESTROY_CHANNEL) (
    HANDLE hChannelHandle
    );
//
// Open a channel
//      hChannelHandle - channel's handle
//
typedef
HANDLE
(*PCM_OPEN_CHANNEL) (
    HANDLE hChannelHandle
    );
//
// Close a channel
//      hChannelInstanceHandle - channel instance's handle
//
typedef
int
(*PCM_CLOSE_CHANNEL) (
    HANDLE hChannelInstanceHandle
    );
//
// Connect to a channel
//      addr - the address of the channel
//
typedef
HANDLE
(*PCM_CONNECT_CHANNEL) (
    BYTE* addr
    );
```

```
//
// Disconnect a channel
//      hChannelInstanceHandle - channel instance's handle
//
typedef
int
(*PCM_DISCONNECT_CHANNEL) (
    HANDLE hChannelInstanceHandle
    );
//
// Read data from a channel
//      hChannelInstanceHandle - channel instance's handle
//      lpBuffer    - data buffer that receives the data
//      bufSize     - size of buffer
//      flags       - the flags:
//                     CM_READ_FLAG_READ_FULL_SIZE  // read full
//                                                  // size buffer
//                     CM_READ_FLAG_PEEK            // MSG_PEEK
//
typedef
int
(*PCM_READ_CHANNEL) (
    HANDLE hChannelInstanceHandle,
    LPVOID lpBuffer,
    int bufSize,
    int flags
);
//
// Write data to a channel
//      hChannelInstanceHandle - channel instance's handle
//      lpBuffer    - data buffer that is going to sent
//      bufSize     - size of buffer
//
typedef
int
(*PCM_WRITE_CHANNEL) (
    HANDLE hChannelInstanceHandle,
    LPVOID lpBuffer,
    int bufSize
);
//
// Disable a channel
//      hChannelInstanceHandle - channel instance's handle
//
typedef
int
(*PCM_DISABLE_CHANNEL) (
    HANDLE hChannelInstanceHandle
);
```

After each connection module is registered, the aggregate connection manager 254 has access to the functions needed in every module. It maintains a list which contains the interfaces' information. The list is g_listInterfaces, and the list member is of the type PCM_INTERFACE_ENTRY which is defined as follows:

```
typedef struct tag_CM_INTERFACE_ENTRY    // entry of interface
                                         list
{
    struct list_head    list;
    LPTSTR              lpInterfaceName;
    CM_INTERFACE        cmInterface;
} CM_INTERFACE_ENTRY, *PCM_INTERFACE_ENTRY;
```

As a member of the aggregate computer system 100, an aggregate computing machine connects to other computing machines through a network or other kind of connection. Before coupling to other machines, a machine establishes a communication channel on the network. The aggregate connection manager 254 creates a communication channel by calling the function CmCreateChannel( ) when it starts. This function creates communication channels on each communication interface, whereby one channel can communicate with others on every connection interface. The aggregate connection manager 254 may optimally choose the best connection interface when there are more than one connection interface available between two computers.

The aggregate connection manager 254 is designed to be able to create more than one channel. There is a list called g_listChannels which records the channels created. The member of the list is of the type PCM_CHANNEL_ENTRY which is defined as follows:

```
typedef struct tag_CM_CHANNEL_ENTRY {    // entry of channel list
    struct list_head    list;            // list head entry
    LPTSTR              lpChannelName;   // name of channel
```

```
    PCM_CALLBACK_ACCEPT    cmCallbackAccept;  // pointer to callback
                                              // function of accept
    CM_CHANNEL_INFO        channelInfo;       // channel's information
    struct list_head       listSubChannel;    // future use
} CM_CHANNEL_ENTRY, *PCM_CHANNEL_ENTRY;
```

In one example, the type and structure are defined by:

```
typedef void (CALLBACK *PCM_CALLBACK_ACCEPT) ( HANDLE
hChannelInstanceHandle );
typedef struct tag_CM_CHANNEL_INFO
{
    TCHAR      szGroupName[256];
    TCHAR      szDescription[1024];
    DWORD      dwProperty;
} CM_CHANNEL_INFO, *PCM_CHANNEL_INFO;
```

However, only one channel is needed and implemented. When the aggregate connection manager 254 starts, it first calls CmInitialize( ) to initialize each connection interface. Then the function CmCreateChannel( ) is called by the configuration manager to create a communication channel named with the machine name. This function calls each interface's create channel function to create channels. When a communication channel is created, the computer acts like a server listening at the channel and accept a connection when another machine connects to it. The channel can be destroyed by calling CmDestroyChannel( ). Once all channels are destroyed for an aggregate computing device, communication with others is ended.

When an aggregate computing machine starts, it broadcasts its information to other computing machines so that the other computing machines know about the starting machine and can communicate with it by the information provided. The broadcast message for VialP module is a UDP packet, which in one example is structured as follows:

```
typedef struct tag_PROVIDER_INFO_UDP_PACKET
{
    DWORD    dwFlag;         // PROVIDER_INFO_FLAG or
                             //
                             QUERY_PROVIDER_INFO_FLAG
    DWORD    dwStatus;       // 1 - start, 2 - running, 3 - close
    DWORD    dwPort;         // port number
    DWORD    dwMachineType;  // machine type
    DWORD    cbMachineName;  // size of the machine name
    TCHAR    szMachineName[1]; // machine name
} PROVIDER_INFO_UDP_PACKET,
*PPROVIDER_INFO_UDP_PACKET;
```

The dwFlag of the UDP packet indicates whether this is a passive broadcast message or not. Because sometimes the broadcast message may be lost, when a machine receives the broadcast message with the QUERY_PROVIDER_INFO_FLAG from the other one, it broadcasts a passive broadcast message with PROVIDER_INFO_FLAG. Via the different flags, the two machines will not infinitely broadcast the messages.

The dwStatus of the UDP packet indicates whether this UDP packet is sent at a starting time, running time or ending time.

To discover the communication channels of other computing machines, there is a query channel function implemented by each connection module. By calling CmQueryChannels( ), in which the connection interfaces' query functions are called, a query channel message is broadcast to others. The message may be the same as the broadcast message described above. Whenever an aggregate computing machine receives the broadcast message, the machine knows which other machine sent the message according to the information provided in the message, and can connect to that machine to identify and retrieve the information needed, such as device list.

Each connection module opens a thread listening to the broadcast message. When the aggregate connection manager 254 receives the broadcast message sent by an aggregate machine, the connection manager 254 discovers the computer's channel and then connects to it to retrieve the device provider information. In each connection module, when the broadcast message is received, it calls CmAddProviderAddr( ) to tell the aggregate connection manager 254 to add the newly discovered provider's address to the provider list g_listRemoteChannels. The member of the list is of the type PROVIDER_ENTRY which in one example is defined as follows:

```
typedef struct tag_PROVIDER_ENTRY   // entry of provider list
{
    struct list_head  list;               // list head entry
    HANDLE            hInterface;         // connection interface
    BYTE              addr[64];           // address defined by interface
    LPTSTR            lpProviderName;     // provider channel name
    DWORD             dwProviderType;     // machine type
    LPTSTR            lpDescription;      // provider channel description
    DWORD             dwProperty;         // property of provider channel
    //struct list_head listSubChannel;    // provider channel's
                                          // sub-channel list
} PROVIDER_ENTRY, *PPROVIDER_ENTRY;
```

After the provider entry is added to the list, it calls g_cmCallbackQuery( ) which is the callback function registered in CmQueryChannels( ). The provider is added by the aggregate device manager 252 via a VmFoundNewProvider( ) function.

The connection between two computing machines may be established by calling CmConnectChannel( ), which is defined as:

```
HANDLE CmConnectChannel ( HANDLE hProvider );
```

The parameter is the handle to the device provider, which can be obtained in the member of the list g_listRemoteProviders. It is the hProvider of REMOTE_PROVIDER_ENTRY. As it may be blocked when connecting, a thread calling CmConnectWatchThread( ) is created before connecting to display a message, e.g., to tell users "Connecting . . . Please . . . wait" or the like.

After the connection is established, a handle instance of this connection is allocated as a structure CM_HANDLE_INSTANCE which is defined as follows:

```
typedef struct tag_CM_HANDLE_INSTANCE
{
    HANDLE    hInterface;
    HANDLE    handle;
    HANDLE    hProvider;
} CM_HANDLE_INSTANCE, *PCM_HANDLE_INSTANCE;
```

The above structure records the connection interface handle hInterface, the handle of this connection for the interface handle, and also the handle to the device provider hProvider. The handle instance structure is needed when using other connection functions such as CmReadChannel( ) and CmWriteChannel( ), which are connection interface related. Via the interface handle and the handle of the connection for this interface, a function such as CmReadChannel( ) can call the specified interface's read function to read data from the channel.

In order to make the computing machines in different aggregate computer systems connect to each other to get the device list information, a group name is used in the channel. The group name is also the name of the whole aggregate computer system 100, and is in the channelInfo member of CM_CHANNEL_ENTRY and is assigned when the communication channel is created. After a connection is established by a certain interface, the aggregate connection manager 254 sends the following data:

```
DWORD   cbLength;
TCHAR   szGroupName[ ];
```

The machine that accepted the connection receives the data and identifies whether they are in the same group, and returns a DWORD accept (code 1) if yes, or refuse (code 0) if not.

After the group name identification passes, the connection between the aggregate connection managers (e.g., 254L and 254R) of the two computing machines is established. They call CmReadChannel( ) or CmWriteChannel( ) to receive or send data, respectively. When the data transfer is completed and connection is no longer needed, the function CmDisconnectChannel( ) is called to disconnect and the channel instance which is allocated when the connection established will be released.

Turning to aspects related to virtual displays, in general, to draw to a screen requires a display driver (e.g., a .dll file whose primary responsibility is rendering), a video miniport driver 800 (FIG. 8; e.g., a .sys file whose responsibilities include resource management, such as hardware configuration, and physical device memory mapping specific to the video hardware) and a display adapter. Display adapters usually have frame buffers that can be mapped linearly into CPU address space; a frame buffer is a dedicated memory on a video adapter that can hold the contents of a single screen image.

Figure 8:
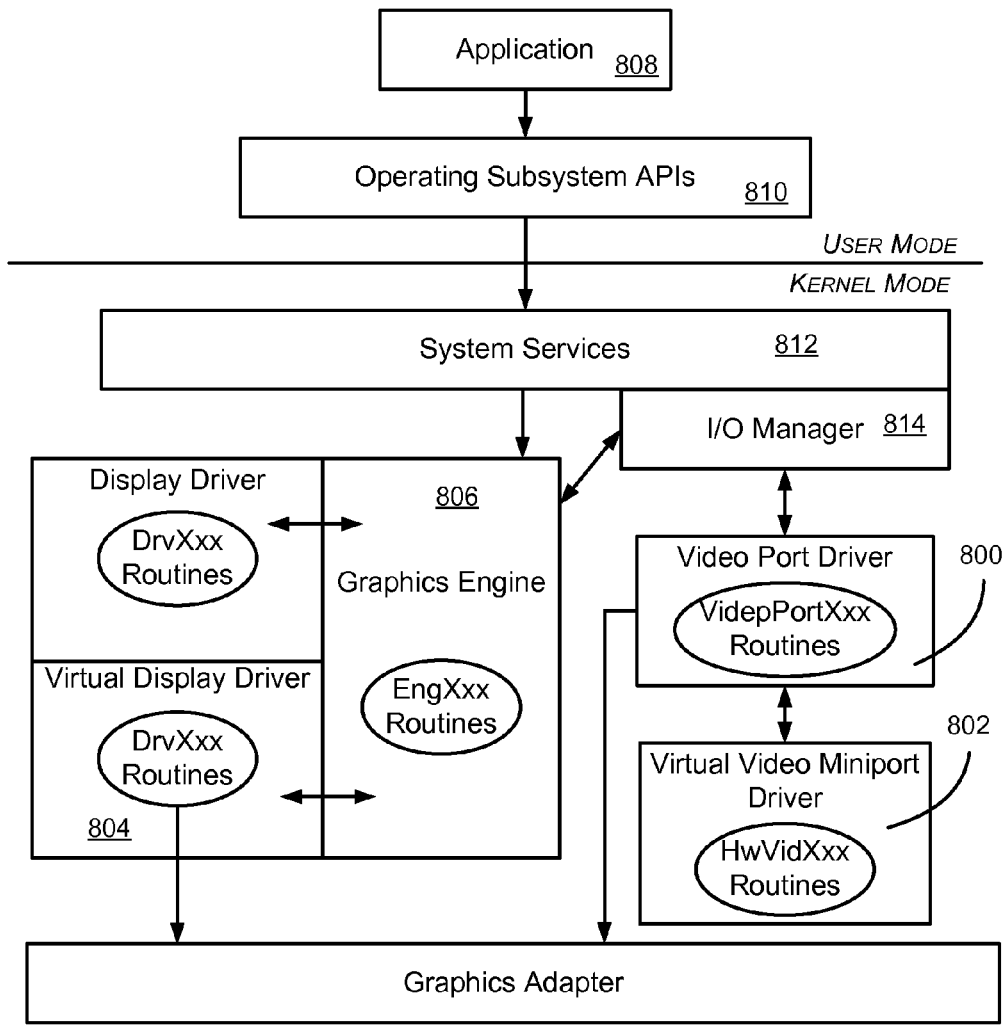
FIG. 8 is a representation of an example graphics architecture with a virtual display driver.

FIG. 8 shows a general graphics architecture including a virtual display driver. To implement a virtual display driver, there is provided a virtual video miniport driver 802 without operation on hardware, and a virtual display driver 804, with a frame buffer allocated for the graphics engine 806 to draw on. A user mode application 808 reads its content, such as by communicating with the virtual display driver 804 or by calling GDI functions. Operating subsystem APIs 810, system services 812 and an I/O manager 814 provide the communication mechanism.

By way of example of a miniport driver 802, consider a mirror driver, which is a display driver for a virtual device that mirrors the drawing operations of one or more additional physical display devices. A mirror driver is implemented and behaves much like any other display driver, however, its paired video miniport driver is minimal in comparison to a typical miniport driver.

A virtual miniport driver 802 relies on a port driver 800 and handles device-specific operations for the port driver 800. For example, a video miniport driver replies on a video port driver (videoprt.sys) which exports functions such as VideoPortXxx. A video miniport driver calls these functions to handle device-specific operations. For most types of devices, the port driver 800 is supplied with the operating system, and the miniport driver is supplied by a device vendor. The following system-defined functions are implemented in the virtual video miniport driver 802:

| Required Function Name | Description |
| --- | --- |
| DriverEntry | Initializes video miniport driver. |
| HwVidFindAdapter | Gets access ranges for devices on an enumerable bus; if necessary, determines the device type. |
| HwVidGetPowerState | Queries whether a device can support the requested power state. |
| HwVidGetVideoChildDescriptor | Enumerates the child devices attached to the specified device. |
| HwVidInitialize | Performs one-time initialization of the adapter for the corresponding display driver. Called in response to a request to open the adapter. |
| HwVidSetPowerState | Sets the power state of the specified device. |
| HwVidStartIO | Begins processing of the incoming VRP. |

In DriverEntry, VideoPortInitialize is called exported by video port driver with a data structure VIDEO_HW_INITIALIZATION_DATA filled with entry points of HwVidXxx functions implemented by the virtual driver to complete the initialization of the virtual miniport driver.

Because the virtual video miniport driver 802 is implemented without hardware operation, the routines are completed by returning a default successful or no error code, and build the driver. The following comprises a list of return value of each function:

| Required Function Name | Return Value |
| --- | --- |
| DriverEntry | Return Value of VideoPortInitialize |
| HwVidFindAdapter | NO_ERROR |
| HwVidGetPowerState | NO_ERROR |
| HwVidGetVideoChildDescriptor | ERROR_NO_MORE_DEVICES |
| HwVidInitialize | TRUE |
| HwVidSetPowerState | NO_ERROR |
| HwVidStartIO | TRUE |

To implement a virtual display driver 804, the driver needs to enable and disable the graphics hardware, supply GDI with information about hardware capabilities, and enable the drawing surface. The following table lists functions that the virtual display driver 804 implements. Following DrvEnableDriver, the remaining functions are listed alphabetically; note that except for DrvEnableDriver, which GDI calls by name, the other display driver functions do not have fixed names, and are listed with pseudonyms:

| Function | Description |
| --- | --- |
| DrvEnableDriver | As the initial driver entry point, provides GDI with the driver version number and entry points of optional functions supported. |

| Function | Description |
|---|---|
| DrvAssertMode | Resets the video mode for a specified video hardware device. |
| DrvCompletePDEV | Informs the driver about the completion of device installation. |
| DrvDisableDriver | Frees all allocated resources for the driver and returns the device to its initially loaded state. |
| DrvDisablePDEV | When the hardware is no longer needed, frees memory and resources used by the device and any surface created, but not yet deleted. |
| DrvDisableSurface | Informs the driver that the surface created for the current device is no longer needed. |
| DrvEnablePDEV | Enables a PDEV. |
| DrvEnableSurface | Creates a surface for a specified hardware device. |
| DrvGetModes | Lists the modes supported by a specified video hardware device. |

When a Microsoft® NT-based operating system enables a display driver, it first calls the driver's DrvEnableDriver function. As other functions in the driver do not have fixed names, the driver has to send GDI a pointer to a function list. According to this list, the GDI calls other required functions of the driver to complete the initialization.

After DrvEnableDriver is called, GDI calls DrvEnablePDEV in succession to get a description of the physical device's characteristics. A primary responsibility of the driver's DrvEnablePDEV function is to fill in two system-defined structures, GDIINFO and DEVINFO, create and fill in a driver-defined structure PDEV that identifies the enabled device and return a handle to it. These operations are based on the received DEVMODE structure and device name.

PDEV is a driver-defined structure which describes private device instance information. It is maintained by driver itself. The driver can store information they need such as handles and screen's properties in it. Any global variables should be stored in this device specific structure, and the pointer to this data structure will be passed in when most driver functions are called.

The GDIINFO structure describes the graphics capabilities of a given device. The DEVINFO structure provides information about the driver and its private PDEV to the graphics engine. Both of them can be filled according to samples in DDK.

The operations in DrvEnablePDEV are structure filling processes except palette handle filling requires calling of EngCreatePalette, which is important to 8 bpp and 16 bpp display mode. Because in 8 bpp and 16 bpp display mode, RGB colors are indexed or compressed, as there is not enough space to store 3-bytes RGB information. If the display mode is 8 bpp, the EngCreatePalette function is called to create an indexed palette. For 16 bpp, the function is called to indicate which bits in the 16 bits represent red, green, or blue values.

When DrvEnablePDEV is finished, GDI completes the installation of the physical device and then calls DrvCompletePDEV. This provides the virtual driver 804 with a handle to the PDEV to be used when requesting GDI services for the device, and also provides a handle to the physical device that has been installed. This is the GDI handle for the physical device being created. The virtual driver 804 uses this handle when calling GDI functions, and thus the virtual driver store the GDI handle in its PDEV structure.

With reference to the DrvEnableSurface function, after DrvCompletePDEV is called, GDI calls DrvEnableSurface to let the virtual driver 804 set up a surface to be drawn on and associates it with a given PDEV. Usually, a display driver first calls a miniport driver to map the frame buffer on adapter to a linear memory address, creates a surface and modifies its first scan line's address to the frame buffer's linear memory address, and then associates it with the GDI handle. For a virtual display driver 804, the address is modified to a frame buffer allocated by the virtual display driver 804, not a physical frame buffer's memory address. After this, GDI performs drawing operations on the virtual driver-managed frame buffer.

In order to make memory allocation simpler, EngCreateBitmap may be used instead of EngCreateDeviceSurface to create the surface. This allows GDI to allocate memory for the bitmap and without needing virtual driver management. To get the screen's content of the virtual display driver, a DrvEscape routine may be implemented and registered with GDI; when a user mode application 808 calls the GDI function EscapeExt, GDI interprets the request and calls DrvEscape, whereby the virtual driver 804 can copy the frame buffer's content to the user mode application's memory by parameters.

In an alternative way, the user mode application 808 does not have to be concerned about the virtual display driver, and instead gets the screen content by a GDI function, e.g., by capturing an image. This method is easier to implement as the user application 808 does not have to deal with the raw pixel data according to different color modes, however this may be less efficient. Resources may be released as with conventional video drivers.

To simulate querying the display mode supported by hardware, a constant array of VIDEO_MODE_INFORMATION structures may be defined and initialized with video mode information supported by the virtual driver 804. In the DrvEnablePDEV routine, a query is used to determine whether the video mode is supported, and responded to by filling in the data structures based on the VIDEO_MODE_INFORMATION array.

DrvGetModes is used by GDI to query the list of video modes supported by a specified video hardware device. By calling DrvGetModes to obtain the video mode list, the operating system can let users adjust resolution and color format, e.g., in a display property dialog or the like.

The controller for virtual display driver is developed for the aggregate device manager 252. When it is initialized in the function VDisplayInitialize( ), it registers its interface to the aggregate device manager 252. Both filter driver controller and virtual driver controller are registered in this function and implemented in VDisp.cpp.

The filter driver controller for the virtual display driver 804 is an application running in user mode that displays the virtual display's output image. As with other kinds of filter drivers, it possesses the physical display device and outputs data to the device. In order to make it faster to refresh frames and consume lower CPU time, it uses DirectDraw to display the image.

When the filter driver controller is opened by the aggregate device manager 252, it creates a thread CreateDisplayWindow( ) to display the output of the remote virtual display driver. In this thread, a window is created and the message processing function of this window is VDisplayWndProc( ). More particularly, in one example implementation, it first creates a 640×480 16 bpp DirectDraw window, a global screen hdc and a timer of 30 Hz. Whenever receives a timer message, it calls DrawFrame( ) to draw the global screen hdc. In the function VDisplayWrite( ), the global screen hdc is updated. Some control messages are defined as follows:

```
#define DEVICE_DISPLAY_DATA_MSG        0x00000009
#define DEVICE_DISPLAY_NOT_EXIST_MSG   0x0000000A
#define DEVICE_DISPLAY_FULL_SCREEN     0x0000000B
#define DEVICE_DISPLAY_WINDOWED        0x0000000C
#define DEVICE_DISPLAY_NULL            0x0000000D
#define VDISP_CTL_SET_RESOLUTION       0xA0000000
```

When the first DWORD value of the data input to VDisplayWrite( ) is one of the above message codes, it means, respectively, that the following data is pure display data; the virtual display driver is not yet installed; show in full screen; show in window mode; and empty display message. For set resolution, the data following the message is formed as follows:

```
typedef struct tagSCREEN_RESOLUTION_INFO
{
    int     width;
    int     height;
    int     bpp;
    BOOL    bFullScreen;
    RECT    rcVirtualDesktop;
    RECT    rcScreen;
} SCREEN_RESOLUTION_INFO;
```

After processing the display data, the VDisplayWrite( ) ends back the current mouse cursor data to simulate a remote mouse when the mouse is moving or clicking in the display window.

The aggregate computer system 100 is designed to be able to plug in more than one remote display. To this end, the controller of the virtual display driver has a list g_listVDispDrv to record each different virtual display's information. The member of the list is of the type PVDISP_DRV_ENTRY which is defined as:

```
typedef struct tag_VDISP_DRV_ENTRY
{
    struct   list_head list;        // list head entry
    LPTSTR   szDeviceName;          // device name
    BOOL     bIsMirror;             // is a mirror driver?
    union
    {
        HDC      hDC;               // hdc of the device
        CMirror* pMirror;           // pointer to CMirror object
    };
    BYTE*    frameBuffer;           // pointer to frame buffer
    BYTE*    backBuffer;            // pointer to back buffer
    int      currentIndex;          // current cursor index
    DWORD    tickCount;             // tick count
    DWORD    lastSyncTickCount;     // tick count of last time sync
    int      width;                 // screen width
    int      height;                // screen height
    int      bpp;                   // bits per pixel
    int      x;                     // left-top x position
    int      y;                     // left-top y position
    BOOL     bFullScreen;           // is in full-screen mode
    LPTSTR   lpProvider;            // name of device provider
} VDISP_DRV_ENTRY, *PVDISP_DRV_ENTRY;
```

When a new virtual display is plugged in, the aggregate device manager first plugs in a virtual mouse to make the remote computer able to control the virtual desktop by this virtual mouse. Then the aggregate device manager sends a DEVICE_DISPLAY_NOT_EXIST_MSG message to the remote computer and receives the resolution information for the remote computer. In this way, the virtual display's resolution can be initialized to the resolution of the remote computer's desktop. The resolution of the remote computer's desktop is thus not changed at the very beginning. If the virtual display driver is successfully installed, the calling of the create function of the virtual display driver's controller in succession will be successfully returned. Otherwise, it will continually send the DEVICE_DISPLAY_NOT_EXIST_MSG message to the remote computer and on the remote computer, and the display window will display a message such as "The device is not ready; the virtual display may be not enabled or installed."

After the virtual display driver 804 is created and installed, the aggregate device manager 252 calls its read function to read data from the controller and transfer the data to the remote computer. It also reads virtual mouse messages from the remote computer and sends them to the virtual bus. 440

The display data transferred between the local virtual display driver controller and the remote filter display driver controller may be compressed by a simplified differential run length encoding algorithm, e.g., the function EncodePxl( ).

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A system comprising:
a device-providing computing machine having a first hardware processor; and
a device-consuming computing machine having a second hardware processor,
wherein the device-providing computing machine comprises first computer-executable instructions that cause the first hardware processor of the device-providing computing machine to:
provide a real driver that controls a peripheral device that is physically connected to the device-providing computing machine, the real driver controlling the peripheral device via commands that are received from the device-consuming computing machine via a network; and
control the peripheral device at the device-providing computing machine responsive to the commands received from the device-consuming computing machine,
wherein the device-consuming computing machine comprises second computer-executable instructions that cause the second hardware processor of the device-consuming computing machine to:
provide an application executing on the device-consuming computing machine with control of the peripheral device via a virtual driver that sends the commands from the device-consuming computing machine to the device-providing computing machine over the network.

2. The system according to claim 1, wherein the peripheral device is a peripheral graphics device and the first computer-executable instructions further cause the first hardware processor of the device-providing computing machine to:

in a first instance, lock the peripheral graphics device at the device-providing computing machine responsive to further user input; and send a message over the network from the device-providing computing machine to the device-consuming computing machine indicating that the peripheral graphics device is locked at the device-providing computing machine.

3. The system according to claim 2, wherein the first computer-executable instructions further cause the first hardware processor of the device-providing computing machine to:

display a user interface providing an option to unlock the peripheral graphics device; and in a second instance when the user unlocks the peripheral graphics device via the displayed user interface, send another message from the device-providing computing machine to the device-consuming computing machine indicating that the device-providing computing machine has unlocked the peripheral graphics device.

4. The system according to claim 3, wherein the displayed user interface further allows the user to plug in or plug out another peripheral device that is connected to the device-consuming computing machine.

5. The system according to claim 1, wherein the peripheral device comprises a sound card of the device-providing computing machine that is controlled by the application executing on the device-consuming computing machine.

6. A device-consuming computing machine comprising:

at least one hardware processor; and computer-executable instructions that cause the at least one hardware processor of the device-consuming computing machine to:

execute an application on the device-consuming computing machine; and execute a virtual graphics driver configured to provide the application executing on the device-consuming computing machine with control of a graphics device that is physically connected to a device-providing computing machine and not physically connected to the device-consuming computing machine, the virtual graphics driver controlling the graphics device by sending graphics commands from the device-consuming computing machine to the device-providing computing machine via a network, wherein the device-providing consuming machine executes a real graphics driver configured to control the graphics device locally responsive to the graphics commands received from the device-consuming computing machine that is executing the virtual graphics driver and the application.

7. The device-consuming computing machine according to claim 6, wherein the instructions further cause the at least one hardware processor of the device-consuming computing machine to:

receive a message sent from the device-providing computing machine to the device-consuming computing machine indicating that the graphics device is unlocked; and provide the application executing on the device-consuming computing machine with control of the graphics device that is physically connected to the device-providing computing machine responsive to receiving the message.

8. The device-consuming computing machine according to claim 6, wherein the graphics device is a peripheral device.

9. The device-consuming computing machine according to claim 8, wherein the graphics device is a graphics card.

10. The device-consuming computing machine according to claim 9, wherein the graphics device is physically connected to the device-providing computing machine via a peripheral component interconnect bus.

11. The device-consuming computing machine according to claim 6, wherein the graphics commands sent from the device-consuming computing machine to the device-providing computing machine cause the device-providing computing machine to display a graphical user interface of the device-consuming computing machine thereon.

12. The device-consuming computing machine according to claim 11, wherein the graphical user interface is a desktop of the device-consuming computing machine that is displayed on the device-providing computing machine responsive to receipt, by the device-providing computing machine, of the graphics commands sent from the device-consuming computing machine.

13. A system comprising the device-consuming computing machine of claim 6 and the device-providing computing machine.

14. The device-consuming computing machine according to claim 6, wherein the computer-executable instructions further cause the at least one hardware processor of the device-consuming computing machine to:

install the virtual graphics driver on the device-consuming computing machine responsive to establishing a remote connection with the device-providing computing machine.

15. A method performed by at least one hardware processor of a device-consuming computing machine, the method comprising:

executing an application on the device-consuming computing machine; and providing the application executing on the device-consuming computing machine with a virtual driver that controls an input/output device that is physically connected to a device-providing computing machine, the virtual driver controlling the input/output device by sending commands to the device-providing computing machine via a network, wherein:

the device-providing computing machine controls the input/output device via a real driver, the virtual driver executes on the device-consuming computing machine, and the real driver executes on the device-providing computing machine.

16. The method according to claim 15, further comprising:

executing the virtual driver in kernel mode on the device-consuming computing machine.

17. The method according to claim 15, wherein the input/output device comprises a sound card on the device-providing computing machine that is controlled by the commands sent from the device-consuming computing machine.

18. The method according to claim 15, further comprising:

broadcasting a message to multiple other computing machines indicating that another peripheral device is plugged in or plugged out on the device-consuming computing machine.

19. The method of claim 15, wherein the device-consuming computing machine comprises a laptop computer, the device-providing computing machine comprises a mobile telephone, and the input/output device comprises a camera on the mobile telephone that is controlled by the commands sent from the device-consuming computing machine to the device-providing computing machine.

20. The method of claim 19, wherein the laptop computer controls the camera of the mobile telephone by sending the commands wirelessly.

\* \* \* \* \*